(12) United States Patent
Jong et al.

(10) Patent No.: US 9,088,335 B2
(45) Date of Patent: Jul. 21, 2015

(54) METHOD AND SYSTEM OF PROVIDING LINK ADAPTATION FOR MAXIMIZING THROUGHPUT IN MOBILE SATELLITE SYSTEMS

(75) Inventors: Je-Hong Jong, North Potomac, MD (US); Jun Xu, Germantown, MD (US); Channasandra Ravishankar, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 54 days.

(21) Appl. No.: 13/586,561

(22) Filed: Aug. 15, 2012

(65) Prior Publication Data

US 2012/0307721 A1 Dec. 6, 2012

Related U.S. Application Data

(63) Continuation of application No. 12/626,383, filed on Nov. 25, 2009, now abandoned.

(60) Provisional application No. 61/118,155, filed on Nov. 26, 2008.

(51) Int. Cl.
*H04B 7/185* (2006.01)

(52) U.S. Cl.
CPC .................................. *H04B 7/18513* (2013.01)

(58) Field of Classification Search
CPC .................................................. H04B 7/18513
USPC ......................................... 370/318, 332, 465
See application file for complete search history.

(56) References Cited

U.S. PATENT DOCUMENTS

| | | | |
|---|---|---|---|
| 6,810,255 B2 | 10/2004 | Chen et al. | |
| 7,236,474 B2 * | 6/2007 | Seo et al. | 370/329 |
| 7,277,406 B2 * | 10/2007 | Kim et al. | 370/318 |
| 7,333,812 B2 | 2/2008 | Mochizuki | 455/442 |
| 7,386,321 B2 * | 6/2008 | Miyoshi et al. | 455/522 |
| 7,751,368 B2 * | 7/2010 | Li et al. | 370/332 |
| 7,760,755 B2 | 7/2010 | Ginzburg et al. | |
| 8,355,360 B2 * | 1/2013 | Yang et al. | 370/318 |
| 2001/0029189 A1 | 10/2001 | Mandyam | |
| 2002/0111144 A1 | 8/2002 | Schiff | |
| 2002/0137457 A1 * | 9/2002 | Nivens et al. | 455/13.4 |
| 2003/0039217 A1 * | 2/2003 | Seo et al. | 370/318 |
| 2003/0050008 A1 | 3/2003 | Patterson | |
| 2003/0137650 A1 * | 7/2003 | Fine et al. | 356/39 |
| 2003/0189917 A1 * | 10/2003 | Sudo | 370/347 |
| 2004/0022213 A1 * | 2/2004 | Choi et al. | 370/332 |
| 2004/0093548 A1 * | 5/2004 | Heo et al. | 714/749 |
| 2006/0120470 A1 * | 6/2006 | Hwang et al. | 375/260 |
| 2006/0268976 A1 * | 11/2006 | Baum et al. | 375/239 |
| 2007/0115942 A1 | 5/2007 | Money et al. | |
| 2007/0167183 A1 | 7/2007 | Vasudevan et al. | |
| 2008/0232238 A1 | 9/2008 | Agee | |
| 2009/0274204 A1 * | 11/2009 | Chen et al. | 375/228 |
| 2010/0103867 A1 * | 4/2010 | Kishiyama et al. | 370/320 |
| 2010/0207834 A1 | 8/2010 | Wahlberg et al. | |

FOREIGN PATENT DOCUMENTS

WO  WO/2008/084700  * 7/2008

* cited by examiner

*Primary Examiner* — Jay P Patel
(74) *Attorney, Agent, or Firm* — Potomac Technology Law, LLC

(57) ABSTRACT

Various approaches are introduced to provide link adaptation to maximize the resource utilization of the satellite network: (i) a method to adapt the transmission rate for packet voice and data traffics; (ii) a method to control the transmit power of packet voice and data channels; and (iii) a method to accomplish the feedback loop in a secured and correct manner.

52 Claims, 35 Drawing Sheets

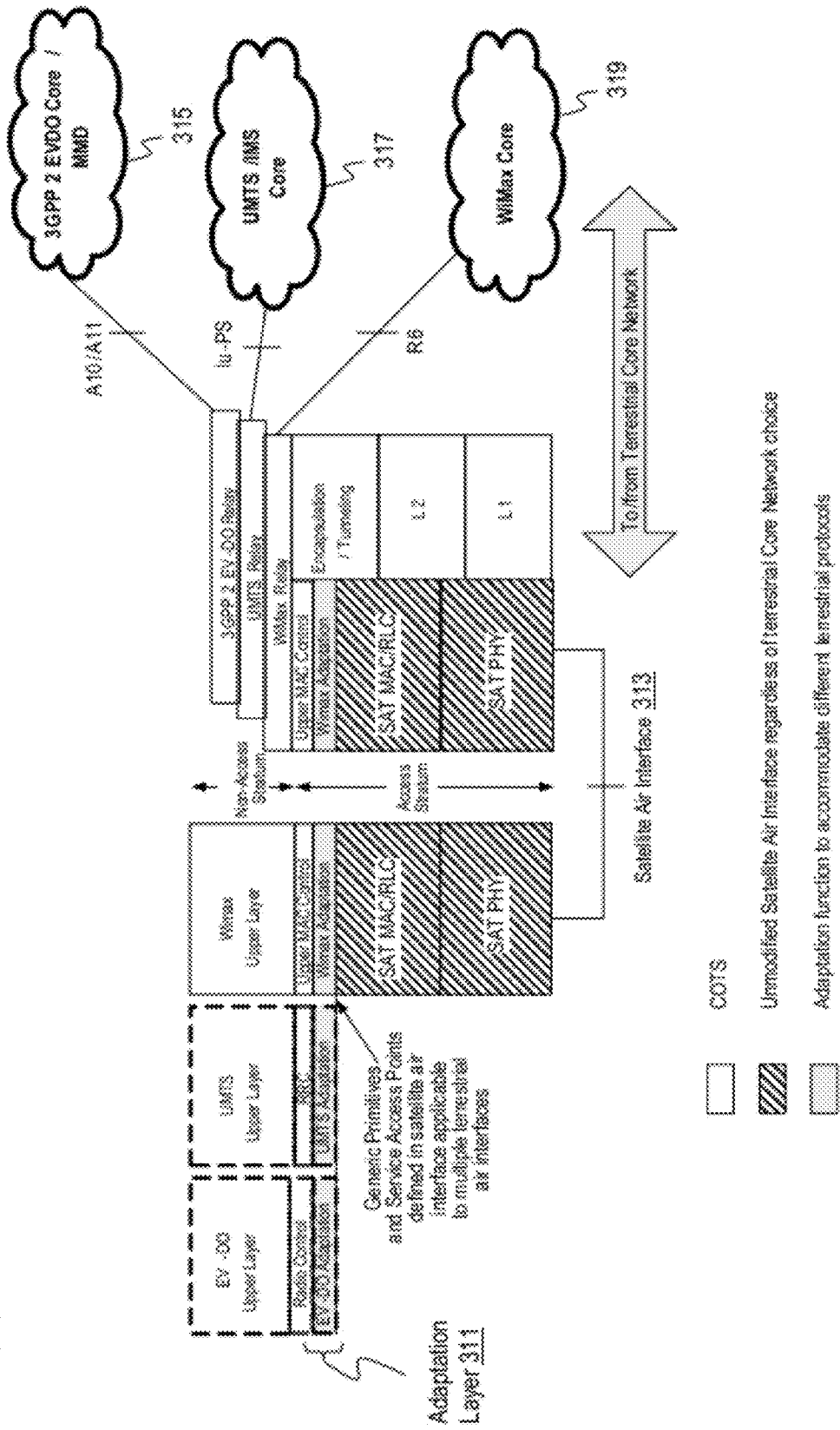

METHOD AND SYSTEM OF PROVIDING LINK ADAPTATION FOR MAXIMIZING THROUGHPUT IN MOBILE SATELLITE SYSTEMS

CROSS-REFERENCE TO RELATED APPLICATIONS

This application is a continuation of U.S. patent application Ser. No. 12/626,383 filed on Nov. 25, 2009, which is related to and claims the benefit of priority under 35 U.S.C. §119(e) to U.S. Provisional Application Ser. No. 61/118,155 filed Nov. 26, 2008; the entirety of which is incorporated herein by reference.

BACKGROUND

Terrestrial communication systems continue to provide higher and higher speed multimedia (e.g., voice, data, video, images, etc.) services to end-users. Such services (e.g., Third Generation (3G) services) can also accommodate differentiated quality of service (QoS) across various applications. To facilitate this, terrestrial architectures are moving towards an end-to-end all-Internet Protocol (IP) architecture that unifies all services, including voice, over the IP bearer. In parallel, mobile satellite systems are being designed to complement and/or co-exist with terrestrial coverage depending on spectrum sharing rules and operator choice. With the advances in processing power of desktop computers, the average user has grown accustomed to sophisticated applications (e.g., streaming video, radio broadcasts, video games, etc.), which place tremendous strain on network resources. The Web as well as other Internet services rely on protocols and networking architectures that offer great flexibility and robustness; however, such infrastructure may be inefficient in transporting Web traffic, which can result in large user response time, particularly if the traffic has to traverse an intermediary network with a relatively large latency (e.g., a satellite network). To promote greater adoption of data communication services, the telecommunication industry, from manufacturers to service providers, has agreed at great expense and effort to develop standards for communication protocols that underlie the various services and features.

Satellite systems possess unique design challenges over terrestrial systems. That is, mobile satellite systems have different attributes that make terrestrial designs either not applicable or inefficient for satellite systems. For example, satellite systems are characterized by long delays (as long as 260 ms one-way) between a user-terminal device and a base-station compared to the relatively shorter delays (e.g., millisecond or less) in terrestrial cellular systems—this implies that protocols on the satellite links have to be enhanced to minimize impact of long propagation delays. Additionally, satellite links typically have smaller link margins than terrestrial links for a given user-terminal power amplifier and antenna characteristics; this implies that higher spectral efficiency and power efficiency are needed in satellite links.

SOME EXEMPLARY EMBODIMENTS

Therefore, there is a need for an approach for providing efficient use of spectral resources of a satellite system when operating with terrestrial systems.

According to certain embodiments, the following approaches provide link adaptation to maximize the resource utilization of the satellite network: (i) a method to adapt the transmission rate for packet voice and data traffics; (ii) a method to control the transmit power of packet voice and data channels; and (iii) a method to accomplish the feedback loop in a secured and correct manner. These embodiments improve spectrum efficiency, as well as combine the merits of rate adaptation and power control for packet switching voice and data channels in a GEO satellite system. These embodiments apply to a communication network involving geosynchronous satellites.

In one embodiment, an approach provides for efficiently utilizing the network resources by the implementation of rate adaptation and power control in the GEO satellite networks.

In another embodiment, an approach is provided for adaptively adjusting the transmission rate of VOIP and packet data using different burst types and modulation-coding schemes based on the measurement of channel condition as well as the knowledge of network resource, such as the total amount of available power for the UT or satellite.

In another embodiment, an approach is provided for controlling the transmit power such that given a certain configuration of burst type and MC scheme, the desired signal quality can be achieved.

In one aspect, an approach accomplishes the feedback loop with control information over the entities in a secured and correct manner.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 3A and 3B are, respectively, a diagram of a user plane protocol architecture for providing a satellite air interface and a diagram of a system supporting different core network choices, according to various exemplary embodiments;

DETAILED DESCRIPTION

An apparatus, method, and software for providing a satellite interface to support mobile communication services are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although certain embodiments are discussed with respect to an Internet Protocol (IP)-based architecture, it is recognized by one of ordinary skill in the art that these embodiments have applicability to any type of packet based communication system and equivalent functional capabilities.

Figure 1A:
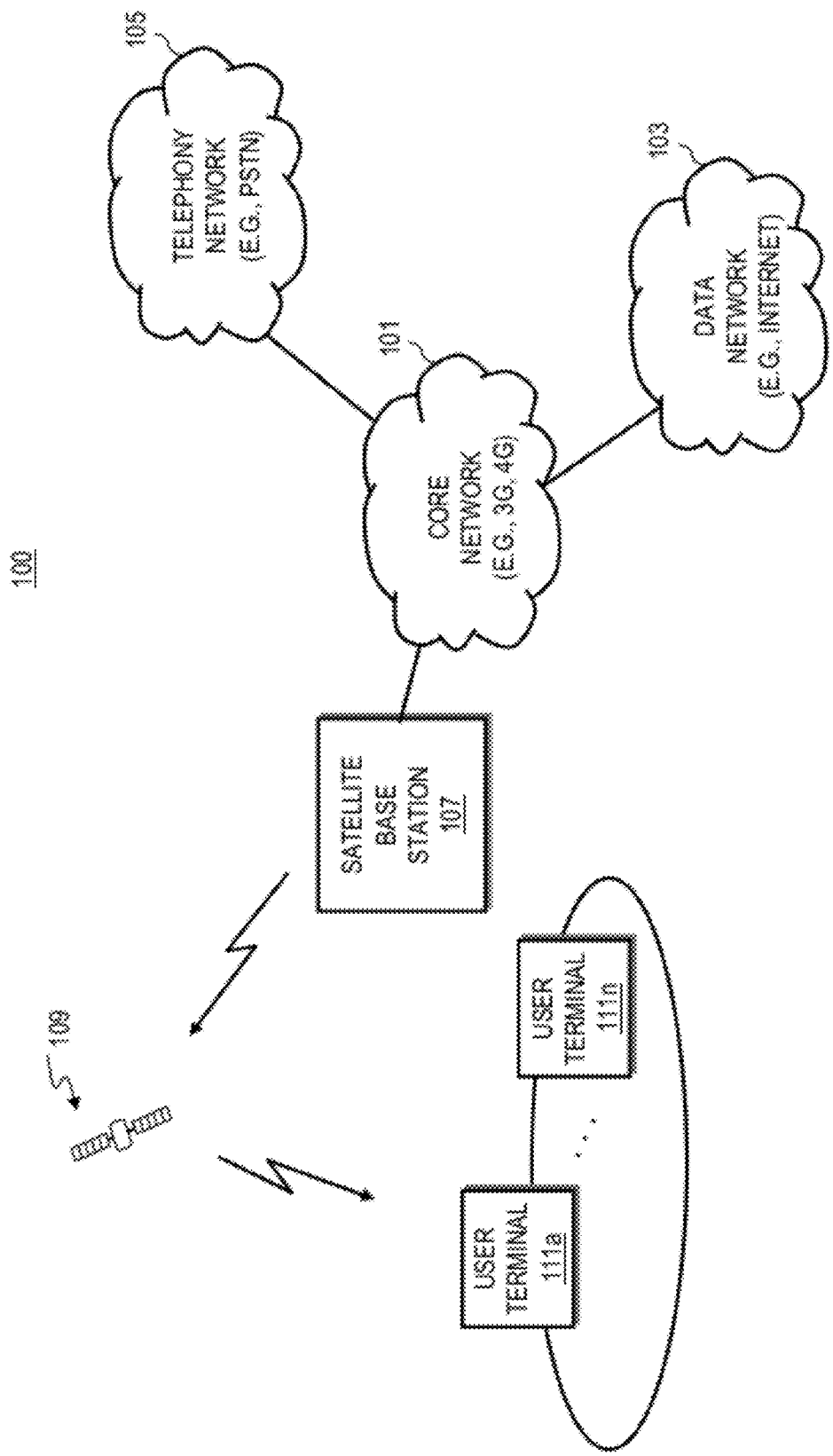
FIGS. 1A and 1B are diagrams of communication systems capable of providing Internet Protocol (IP)-based communication sessions from a terrestrial domain to a satellite domain, according to various exemplary embodiments.
Figure 1B:
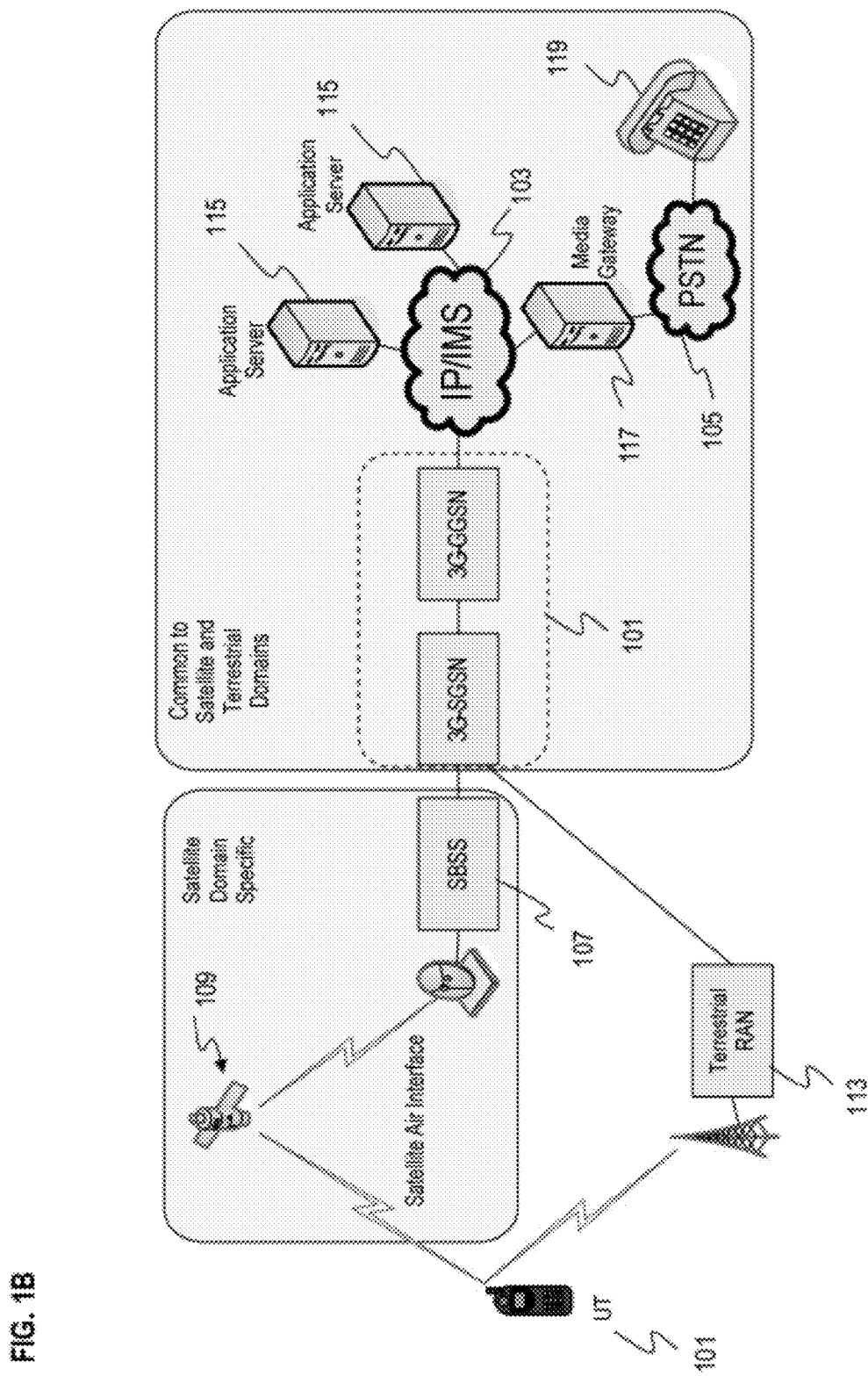

FIGS. 1A and 1B are diagrams of communication systems capable of providing Internet Protocol (IP)-based communication sessions from a terrestrial domain to a satellite domain, according to various exemplary embodiments. For the purposes of illustration, a system 100 of FIG. 1A supports multimedia services using an Internet Protocol (IP) architecture, such that end-to-end communication sessions are packetized. By way of example, a terrestrial core network 101 is a wireless core network that is compliant with a Third Generation (3G) or Fourth Generation (4G) architecture; e.g., Third Generation Partnership Project (3GPP)-based. For example, the system 100 can utilize a satellite air interface denoted as GMR-1 3G, which is an evolution of the GMR-1 air interface standards; GMR-1 3G has been submitted to and is currently under consideration for adoption by European Telecommunications Standards Institute (ETSI) and the International Telecommunication Union (ITU). The wireless core network 101 may also have connectivity to a data network 103 and a telephony network 105.

Networks 101, 103, and 105 may be any suitable wireline and/or wireless network. For example, telephony network 105 may include a circuit-switched network, such as the public switched telephone network (PSTN), an integrated services digital network (ISDN), a private branch exchange (PBX), an automotive telematics network, or other like network. Wireless network 101 (e.g., cellular system) may employ various technologies including, for example, code division multiple access (CDMA), enhanced data rates for global evolution (EDGE), general packet radio service (GPRS), global system for mobile communications (GSM), IP multimedia subsystem (IMS), universal mobile telecommunications system (UMTS), etc., as well as any other suitable wireless medium, e.g., microwave access (WiMAX), wireless fidelity (WiFi), satellite, and the like. Moreover, data network 103 may be any local area network (LAN), metropolitan area network (MAN), wide area network (WAN), the Internet, or any other suitable packet-switched network, such as a commercially owned, proprietary packet-switched network having voice over Internet Protocol (VoIP) capabilities, e.g., a proprietary cable or fiber-optic network.

Within the satellite domain, a satellite base station subsystem (SBSS) 107 is introduced that implements the necessary modifications and enhancements for efficient operation over a satellite 109 to one or more user terminals 111a-111n. These terminals 111a-111n can be of various types with different form factors and transmit capabilities; e.g., sleek hand-held terminals, personal digital assistants (PDAs), vehicular terminals, portable terminals, fixed terminals, automotive telematics terminals, etc.

The SBSS 107 communicates with the wireless network 101, which includes a core network (e.g., 3G/4G) that is unchanged from terrestrial core network. This consequently permits operators to reuse existing 3G/4G core network elements. The interface between the SBSS 107 and the 3G/4G core network 101 can be a standard terrestrial interface.

It is also noted that the architecture of the system 100 permits the same core network element to simultaneously communicate with a terrestrial base station (not shown) and the SBSS 107. This capability is illustrated in FIG. 1B. As seen, the system 100 enables handover procedures between terrestrial base-station and the SBSS 107 to be executed via a core network with standard procedures defined in terrestrial systems. In this example, the UT 111 has the capability to communicate over a satellite link or directly communicate with a terrestrial radio access network 113 to the wireless network 101. By way of example, the data network 103 is configured as an IP/IMS (IP Multimedia Subsystem) with multiple application servers 115 supplying multimedia content. The data network 103 couples to the PSTN 105 via a media gateway 117; the PSTN 105 can serve one or more voice terminals 119.

In the system 100, a radio access bearer (RAB) is associated with Packet Data Protocol (PDP) context maintained between the user terminal (UT) 111 and the core network (CN) 101. For instance, one RAB can be established for Session Initiation Protocol (SIP) call signaling, and be maintained as long as the user wishes to make and receive calls. Another RAB is established on demand for the transport of the voice media while a call is in session. The satellite radio access network establishes and maintains Radio Bearers (RBs) between the UT 111 and the S-BSS 107 necessary to satisfy, for example, Quality of Service (QoS) requirements of the SIP call signaling and Voice over IP (VoIP) user plane RABs. The signaling radio bearer supports signaling connectivity between the UT 101 and the satellite radio access network.

While specific reference will be made thereto, it is contemplated that system 100 may embody many forms and include multiple and/or alternative components and facilities.

Figure 2:
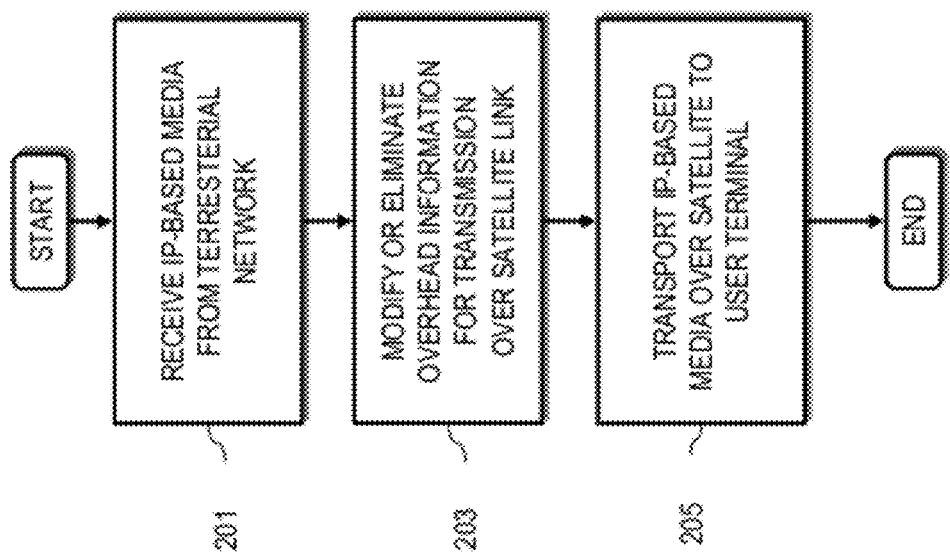
FIG. 2 is a flowchart of a process for providing IP-based communication sessions from a terrestrial network over a satellite link, according to various exemplary embodiments.

FIG. 2 is a flowchart of a process for providing IP-based communication sessions from a terrestrial network over a satellite link, according to various exemplary embodiments. In step 201, IP-based media is received at the SBSS 107 from a terrestrial network (e.g., network 101). The SBSS 107 can then process the media flow to optimize transmission of the IP-based media in terms of, e.g., overhead signaling, delay, or throughput. In step 203, overhead information of the media flow is modified or eliminated altogether for transmission over the satellite link. This processing can occur on a packet-by-packet basis or by segments of packets. Thereafter, the IP-based media is transported over a satellite link to the UT 111, as in step 205.

Figure 3A:
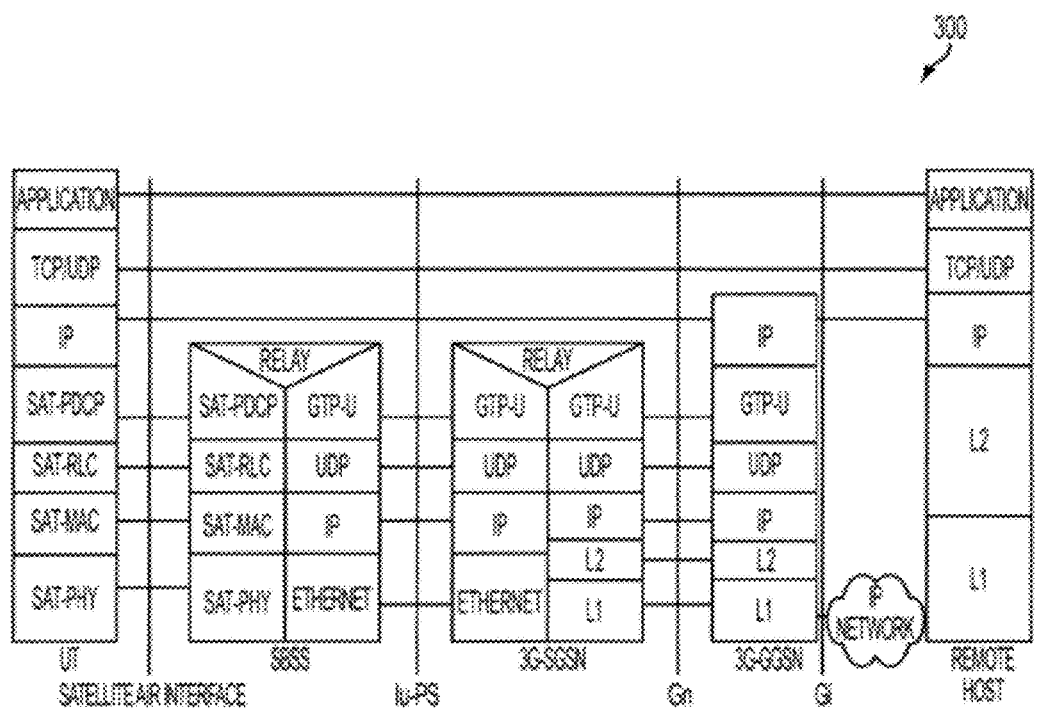

FIGS. 3A and 3B are, respectively, a diagram of a user plane protocol architecture for providing a satellite air interface and a diagram of a system supporting different core network choices, according to various exemplary embodiments. A user plane protocol architecture 300 employs the following higher protocols at the end terminals (e.g., UT and a remote host): an application layer, a TCP/UDP layer, and an IP layer. The UT 111, according to one embodiment, includes the following satellite domain specific protocols to communicate with the SBSS 107: SAT-PDCP (Packet Data Convergence Protocol), SAT-RLC (Radio Link Control), SAT-MAC (Medium Access Control), and SAT-PHY (Physical). To interface with the terrestrial systems, the SBSS 107 provides the following protocols: GTP-U (GPRS Tunneling Protocol-User Plane), UDP (User Datagram Protocol), IP, and Ethernet. On the terrestrial side, the 3G-SGSN (Serving GPRS Support Node) utilizes GTP-U, UPD, IP, L2, and L1 to communicate with the 3G-GGSN (Gateway GPRS Support Node), which employs an IP layer to link to the remote host. Therefore, in the user plane, PDCP, RLC, MAC and PHY layers are optimized for satellite operation. Next, the control plane is described.

As seen in FIG. 3B, a communication system 310 utilizes an adaptation layer 311 to insulate the satellite air interface 313. Consequently, the satellite air interface 313 permits the interoperation with various core networks; e.g., 3GPP2 EVDO (Evolution Data Optimized) core/MMD (Multimedia Domain) network 315, Universal Mobile Telecommunications System/IP Multimedia Subsystem (UMTS/IMS) core network 317, and a WiMax core network 319.

Figure 4:
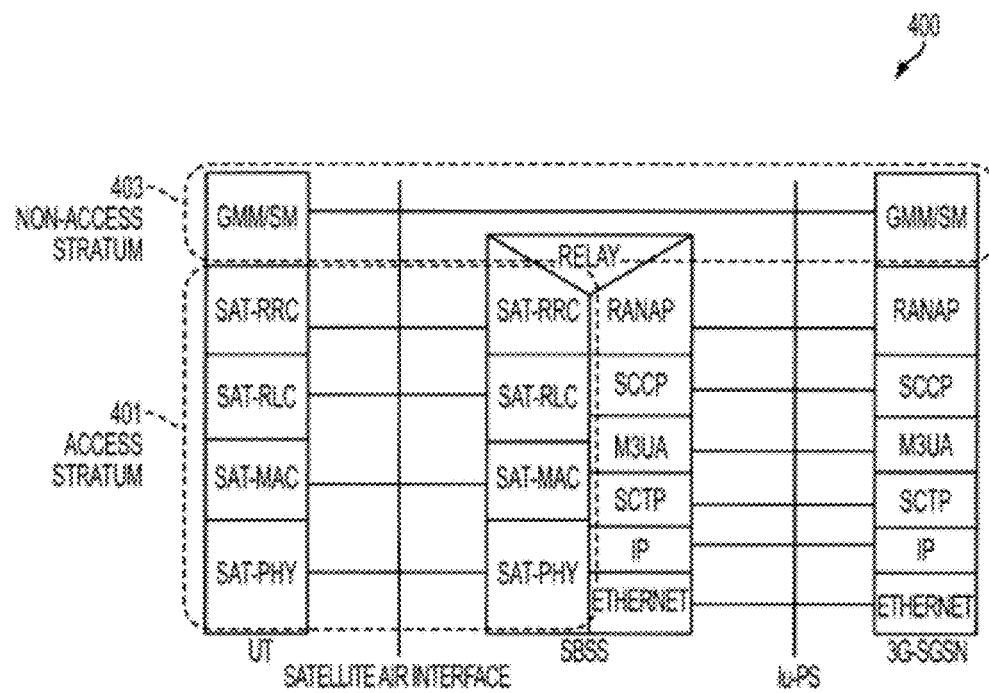
FIG. 4 is a diagram of a control plane protocol architecture for providing a satellite air interface, according to various exemplary embodiments.

FIG. 4 is a diagram of a control plane protocol architecture for providing a satellite air interface, according to various exemplary embodiments. As shown, the SBSS 107 communicates with user terminals (UT) 111 whose radio layer (also called as Access Stratum 401) functionality is consistent with that implemented at the SBSS 107. In this architecture 400, protocol functions and layers above the Access Stratum 401, also referred to as Non-Access Stratum 403 in the UTs 111 are unchanged. Accordingly, these protocols communicate with the core network elements without any modifications to the core network elements. Regardless of what core network elements are chosen by the operator, the satellite-specific access stratum enhancements and modifications between SBSS and UT will remain the same.

In the control plane, the RRC, RLC, MAC and PHY layers are optimized for satellite operation.

According to one embodiment, at the physical layer, the waveforms can be designed to permit operation in multiples of 31.25 kHz and with multiple slot durations. Power efficiency is achieved via use of such waveforms as pi/2 BPSK (Binary Phase Shift Keying), pi/4 QPSK (Quadrature Phase Shift Keying) and 16-APSK (Amplitude Phase Shift Keying) that have lower peak-to-average ratios than their counterparts of BPSK, QPSK and 16-QAM (Quadrature Amplitude Modulation). Bit rates from, e.g., 2.4 kbps to 1 Mbps can be achieved via the use of appropriate channel bandwidth, modulation scheme, coding rate and burst length.

Figure 5A:
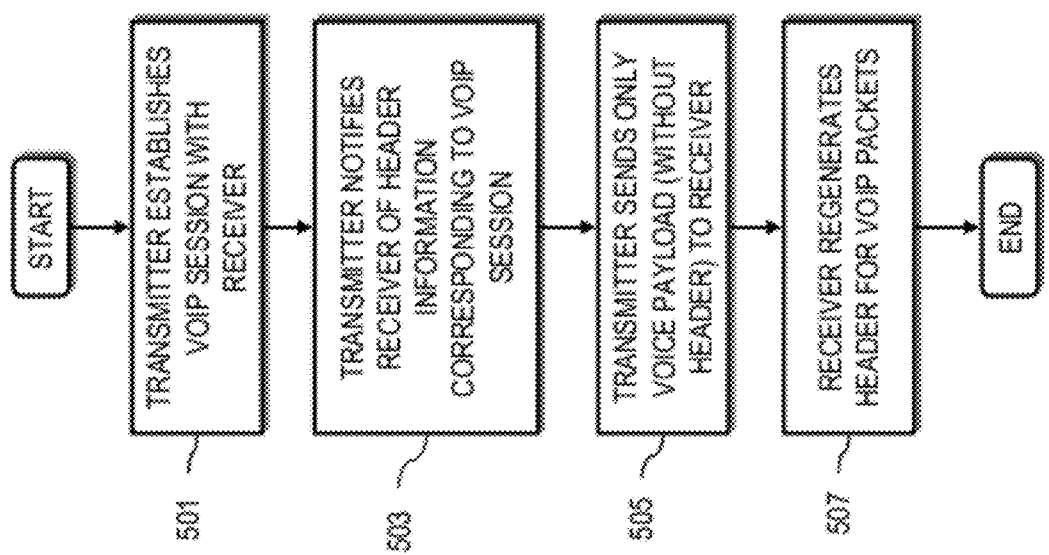
FIGS. 5A and 5B are, respectively, a flowchart and a ladder diagram of processes for providing spectrally efficient Voice over IP (VoIP) sessions, according to various exemplary embodiments.
Figure 5B:
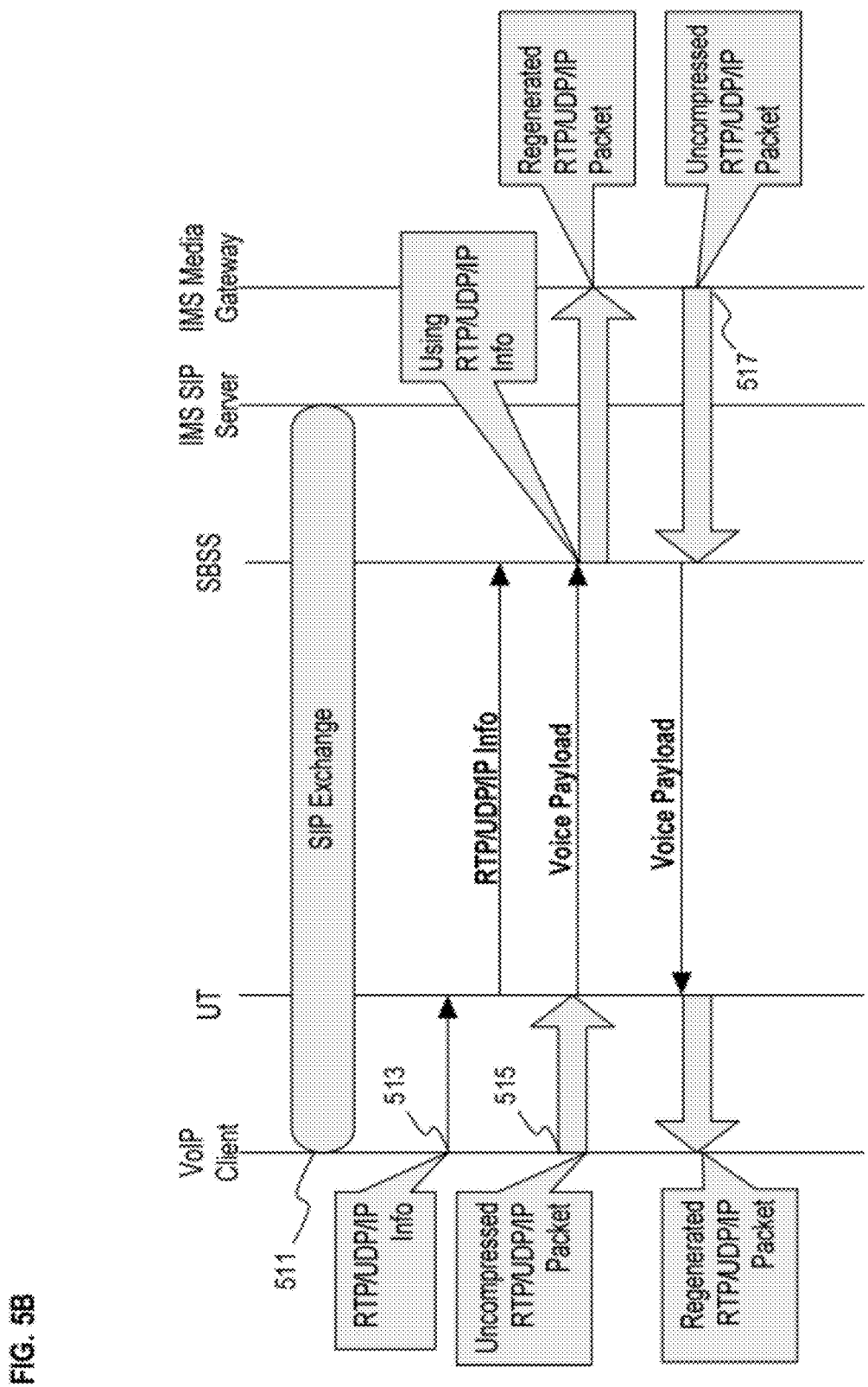

FIGS. 5A and 5B are, respectively, a flowchart and a ladder diagram of processes for providing spectrally efficient Voice over IP (VoIP) sessions, according to various exemplary embodiments. A key attribute of an all-IP system is that, all services including voice is carried over IP—i.e., Voice over IP or VoIP. That is, encoded voice is transmitted across the satellite system as IP packets. Unlike circuit-switched voice, VoIP packets carry header information whose size can be 40 or 60 bytes for IPv4 and IPv6, respectively. The percentage overhead is a function of the payload that the VoIP packet carries; therefore lower rate vocoders that are typically used in satellite systems will incur significantly higher percentage of overhead compared to terrestrial systems. As an example, a terrestrial system with a 12.2 kbps Adaptive Multi-Rate (AMR) vocoder will incur a overhead of about 66% for IPv4 (100% for IPv6), whereas a 4 kbps vocoder used in satellite systems will incur an overhead of about 200% (300% for IPv6). Moreover, this does not take into account Layer 2 overhead that is typically used in packet systems with bandwidth on demand, in which the overhead can be between 5 to 6 bytes leading to additional degradation in efficiency. Therefore, VoIP sessions are costly with respect to signaling overhead.

By way of example, the VoIP session utilizes Session Initiation Protocol (SIP) to establish voice communication between two parties. SIP protocol serves as the call control protocol for establishing, maintaining and teardown of VoIP calls. SIP provides a flexible framework for handling multimedia services, affording the end user with flexibility in influencing network behavior to suit their needs. This call control protocol further provides seamless interoperability across wireline and wireless networks.

A detailed discussion of SIP and its call control services are described in IETF RFC 2543, IETF RFC 3261 and IETF Internet draft "SIP Call Control Services", Jun. 17, 1999; these documents are incorporated herein by reference in their entireties. SIP messages are either requests or responses. The user terminal 111 can be a user agent that behaves as either a user agent client (UAC) or a user agent server (UAS), depending on the services that the system 100 is executing. In general, a user agent client issues requests, while a user agent server provides responses to these requests.

SIP defines various types of requests, which are also referred to as methods. The first method is the INVITE method, which invites a user to a conference. The next method is the ACK method, which provides for reliable message exchanges for invitations in that the client is sent a confirmation to the INVITE request. That is, a successful SIP invitation includes an INVITE request followed by an ACK request. Another method is a BYE request, which indicates to the UAS that the session should be released. In other words, BYE terminates a connection between two users or parties in a conference. The next method is the OPTIONS method; this method solicits information about capabilities and does not assist with establishment of a session. Lastly, the REGISTER provides information about a user's location to a SIP server.

According to one embodiment, the system 100 provides delivery of media sessions using an IP-based approach. Specifically, the system 100 uses a signaling protocol (e.g., SIP) in conjunction with a standard data packet format (e.g., Real-time Transport Protocol (RTP)) to deliver communication services. More specifically, the signaling protocol is used to establish, modify, and terminate a media session, while the standard data packet format serves as the conduit for carrying audio and video over the system 100.

To address the issue of costly overhead in support VoIP traffic, an approach is introduced that eliminates the overhead all together. As seen in FIG. 5A, in step 501, a transmitter (UT 111 or SBSS 107 depending on the direction of information transfer) establishes a VoIP session with a receiver (SBSS 107 or UT 111). To support voice service, according to one embodiment, the user data stream includes the following: IP multimedia subsystem (IMS) signaling stream, Real-Time Control Protocol (RTCP) stream, and Real-Time Protocol (RTP) speech stream. These streams can be transported over the same bearer (the same Packet Data Protocol (PDP) Context/radio access bearer (RAB)) or over different bearers.

To ensure that quality of service (QoS) differentiation can be afforded to the voice media stream relative to that of IMS signaling a separate PDP Context/RAB can be established for IMS signaling. This enables the optimization of bandwidth usage over the satellite link in the system 100 (of FIG. 1) by providing the real-time, low latency guarantees to the voice media stream. For example, session control signaling (e.g., Session Initiation Protocol (SIP)/Session Description Protocol (SDP)) can be utilized over User Datagram Protocol (UDP)/IP for application control between the terminals 111. SIP signaling can be used for multimedia session control.

In step 503, the transmitter notifies the receiver of the header information corresponding to the VoIP session. Voice payload (media) are carried over RTP/UDP/IP. The coded speech is carried alongside the payload descriptor in the media/RTP payload. Dual Tone Multi-frequency (DTMF) and Silence Insertion Descriptor (SID) packets are also carried alongside the speech packets. Thus, the overhead includes the RTP/UDP/IP header. Subsequently, the transmitter need only transmit the voice payload without the header information to the receiver, as in step 505. The receiver, upon receiving the voice payload, regenerates the header for the VoIP packets for further routing to the end user (step 507). This process thus completely eliminates the RTP/UDP/IP header at the transmitter and regenerates headers at the receiver. In other words, the transmitting entity informs the receiving entity about the details of the header at the beginning of a VoIP call.

In the scenario of FIG. 5B, the VoIP session utilizes Session Initiation Protocol (SIP) to establish voice communication between two parties. SIP protocol serves as the call control protocol for establishing, maintaining and teardown of VoIP calls. SIP provides a flexible framework for handling multimedia services, affording the end user with flexibility in influencing network behavior to suit their needs. This call control protocol further provides seamless interoperability across wireline and wireless networks.

For the purposes of illustration, only one party is depicted to highlight the satellite link between the SBSS 107 and the UT 111. In step 511, the SIP exchange necessary to establish a communication session is performed between a VoIP client (in communication with the UT 111) and a SIP server. In an exemplary embodiment, the VoIP client can reside within the UT 111. Next, in step 513, the VoIP client transmits header information, e.g., RTP/UDP/IP information, to the SBSS 107, which then stores this information. The SBSS 107 provides the association of this header information with the particular VoIP session. In one embodiment, the scheme also takes advantage of the periodic nature of resource allocation for transmission of VoIP payloads in order to regenerate RTP headers.

In step 515, the VoIP client generates a voice packet with uncompressed RTP/UDP/IP information. The UT 111 strips this information from the voice packet, leaving only the voice payload to be transmitted to the SBSS 107 over the satellite link. In this manner, overhead information is eliminated from utilizing precious satellite capacity. At the SBSS 107, the RTP/UDP/IP information is retrieved and used to regenerate the entire voice packet for forwarding to the media gateway 117, for example. The media gateway 117 can then terminate the call to the voice station 119 over the PSTN 105. In step 517, the media gateway 117 generates a voice packet conveying information from the voice station 119; this packet includes uncompressed RTP/UDP/IP information, which the SBSS 107 strips off. The SBSS 107 generates a satellite frame with only the voice payload to transport to the UT 111. At the UT 111, the voice packet is regenerated with the corresponding RTP/UDP/IP information.

In the above process, the physical channel is defined such that a known number of VoIP payloads are carried in each burst. The receiver is able to extract the VoIP payloads at the physical layer and attach a header based on information received at the beginning of the VoIP session. Media handling is illustrated in FIG. 6.

To provide maximum spectrally efficiency over the satellite interface 313, all packet overhead is removed and only the payload voice frames are transmitted. Any header information used for communications between the vocoders are thus removed prior to transmission on the satellite link and regenerated following reception. The PHY layer provides indications of the channel as well as the transmission content that allows for the indirect communication of information across the satellite link and necessary regeneration of header information. Before entry into the terrestrial network, e.g., core network 101, the header information is put back.

Figure 6:
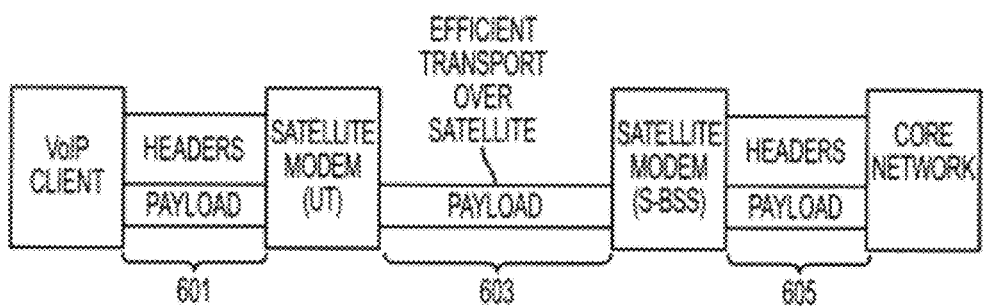
FIG. 6 is a diagram of a communication system for providing media handling to achieve circuit-switched efficiency for VoIP, according to various exemplary embodiments.

FIG. 6 is a diagram of a communication system for providing media handling to achieve circuit-switched efficiency for VoIP, according to various exemplary embodiments. As shown, in the segment 601, header information is exchanged. In segment 603 (i.e., satellite link), the satellite link carries only payload. The process of FIG. 5 involves elimination of the need to transfer details of header information in the direction from SBSS 107 to UT 111. In this example, the UT 111 is able to regenerate, in an exemplary embodiment, the RTP/UDP/IP headers purely based on the knowledge of what the application is using in terms of source IP address, destination IP address, source port and destination port. Also, the SBSS 107 can regenerate the voice packets for communication with the core network (e.g., network 101 of FIGS. 1A and 1B); segment 605 from the SBSS 107 to the core network 101 utilize headers as well as the payload.

In addition to the above arrangement, the satellite interface can be further optimized in support of voice communications.

Figure 7A:
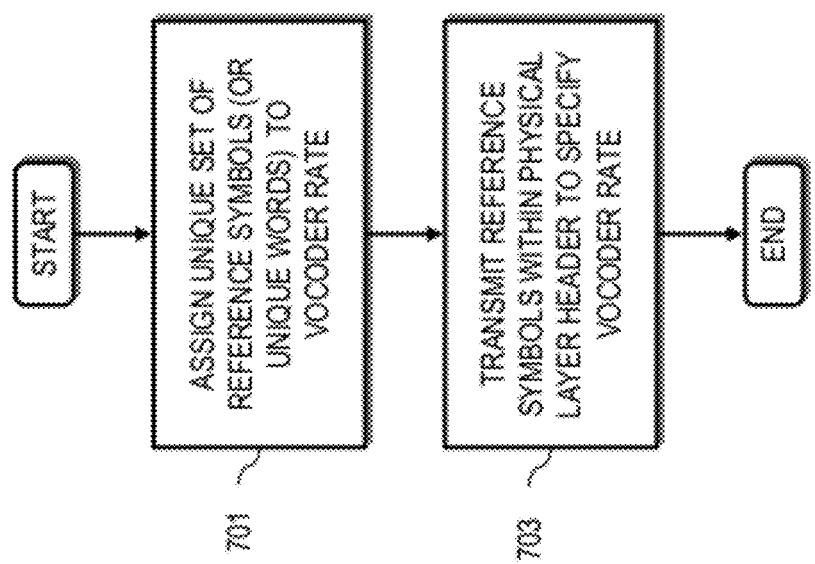
FIGS. 7A and 7B are, respectively, a flowchart of a process for providing multiple vocoder rate operation, and a diagram of a frame structure for supporting the process, according to various exemplary embodiments.
Figure 7B:
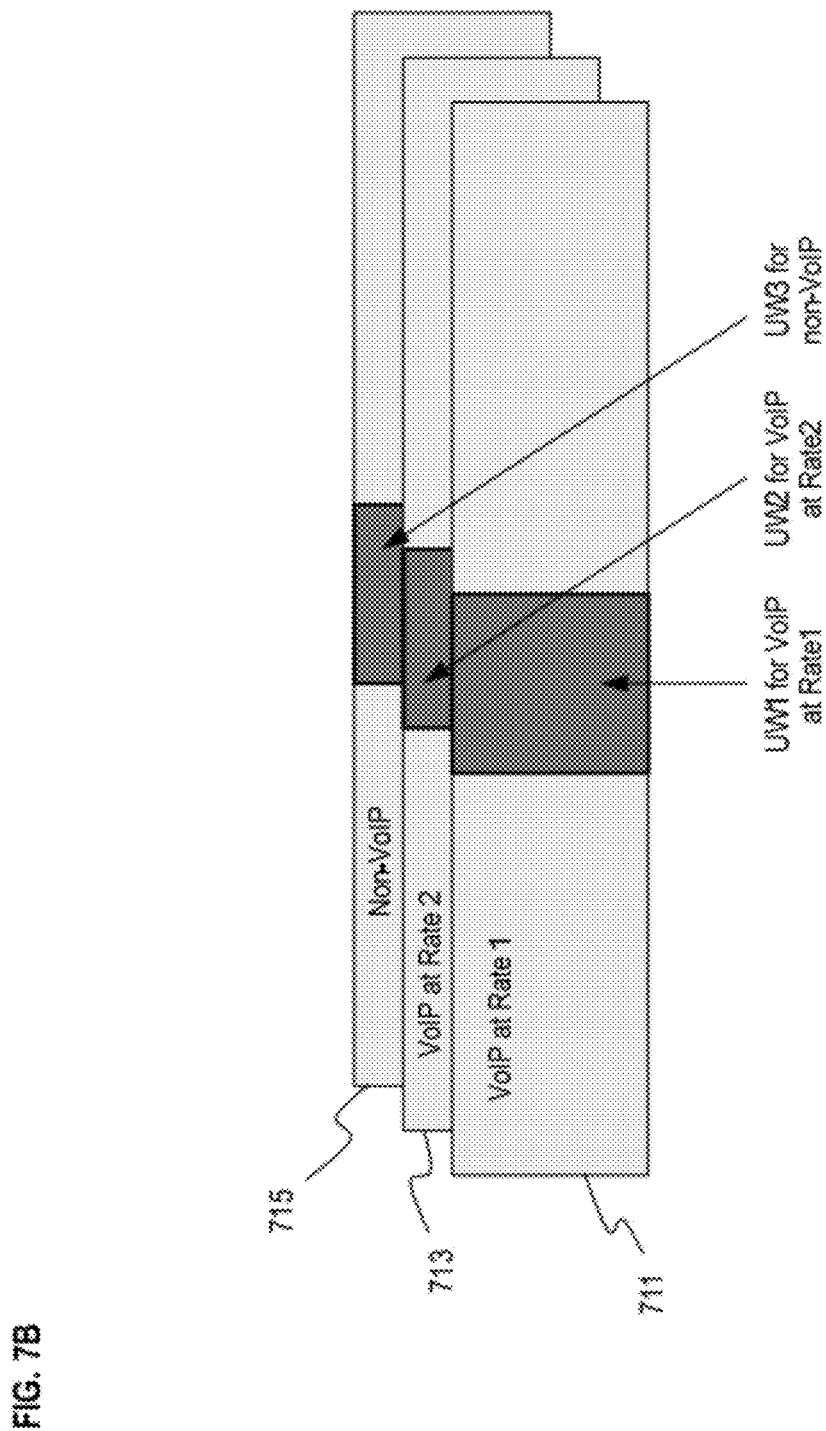

FIGS. 7A and 7B are, respectively, a flowchart of a process for providing multiple vocoder rate operation, and a diagram of a frame structure for supporting the process, according to various exemplary embodiments. Vocoder rate adaptation maintains voice quality when channel conditions degrade. According to one embodiment, the system 100 is also capable of carrying VoIP with circuit-switched spectral efficiency even when the vocoder is operating at multiple rates. By contrast, conventionally vocoder rate changes are indicated explicitly within the header—e.g., via a 1-byte header. To avoid such costly overhead, the system 100 utilizes a physical layer assisted method to determine the rate at which the voice encoder operates. Also, a physical layer assisted header compression scheme permits transmission of non-VoIP information on the same channel as provided for VoIP.

FIG. 7A shows the physical layer assisted approach. In step 701, a unique set of reference symbols (or Unique Words) are used for determining the rate at which voice encoder operated at the transmitter. These reference symbols can also be used to determine whether a received burst carries voice information or non-voice information. In step 703, these reference symbols are transmitted within the physical layer header, thereby negating signaling such information at a higher layer.

In the example of FIG. 7B, the physical frame structures 711, 713, 715. Frame 711 includes a unique word, UW1, corresponding to a particular rate, Rate 1, while frame 713 provides a different unique word, UW2, for a different rate, Rate 2. Furthermore, yet another unique word, UW3, can be specified, as shown in frame 715, to indicate a non-VoIP communication session.

Within the core network 101, the Media/RTP flow carries coded speech for voice services; e.g., the overall packets for the media flow carrying speech are Codec/RTP/UDP/IPv6. Voice traffic within the system 100 can be based, for instance, on Adaptive Multi-Rate (AMR) and DVSI vocoders. The RTP payload size for AMR 12.2 kbps coded speech is 32 bytes, and for the DVSI 4 kbps coded speech it is 10 bytes. Such flow can support Real Time/Conversational communications. In the case of a fixed packet size of 70 bytes, 60 bytes of uncompressed RTP/UDP/IPv6 header is provided every 20 ms (for 4 kbps coded speech with Silence Insertion Descriptor (SID) packets during voice inactivity). With the vocoder configured for two voice frames per packet, 80 bytes is generated every 40 ms. Alternatively, if the flow utilizes a fixed packet size of 50 bytes, 40 bytes of uncompressed RTP/UDP/IPv4 header are provided every 20 ms (for 4 kbps coded speech with SID packets during voice inactivity). With the vocoder configured for two voice frames per packet, 60 bytes is generated every 40 ms.

The voice payload from the DVSI vocoder is formed every 20 ms. However, to reduce end-to-end overhead, the vocoder can also be configured to concatenate two voice frames within a single vocoder payload, i.e. two voice frames per IP/UDP/RTP packet. The two 20 ms frames will form a single packet transmitted across the satellite air interface (e.g., using a 40 ms frame).

Figure 8A:
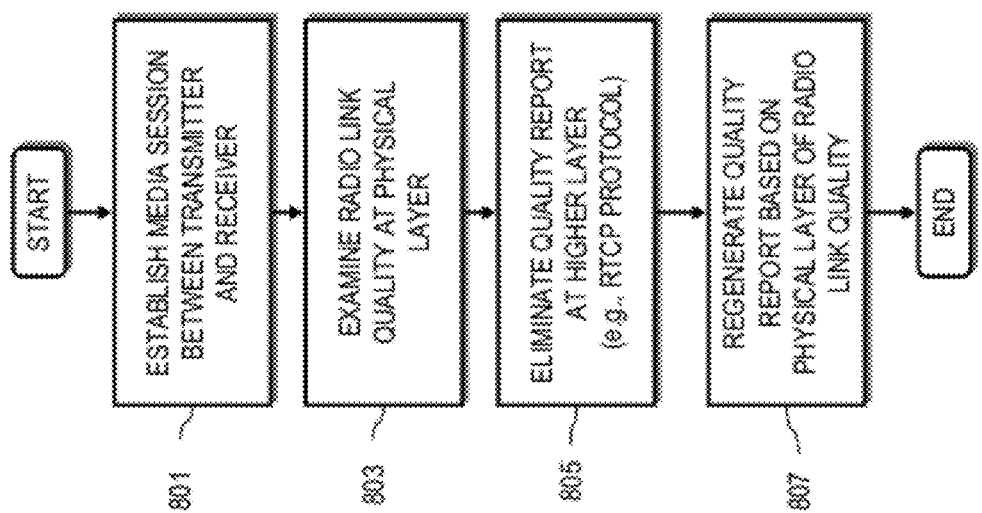
FIGS. 8A and 8B are, respectively, a flowchart and a ladder diagram of processes for providing link quality reports in support of a communications session, according to various exemplary embodiments.
Figure 8B:
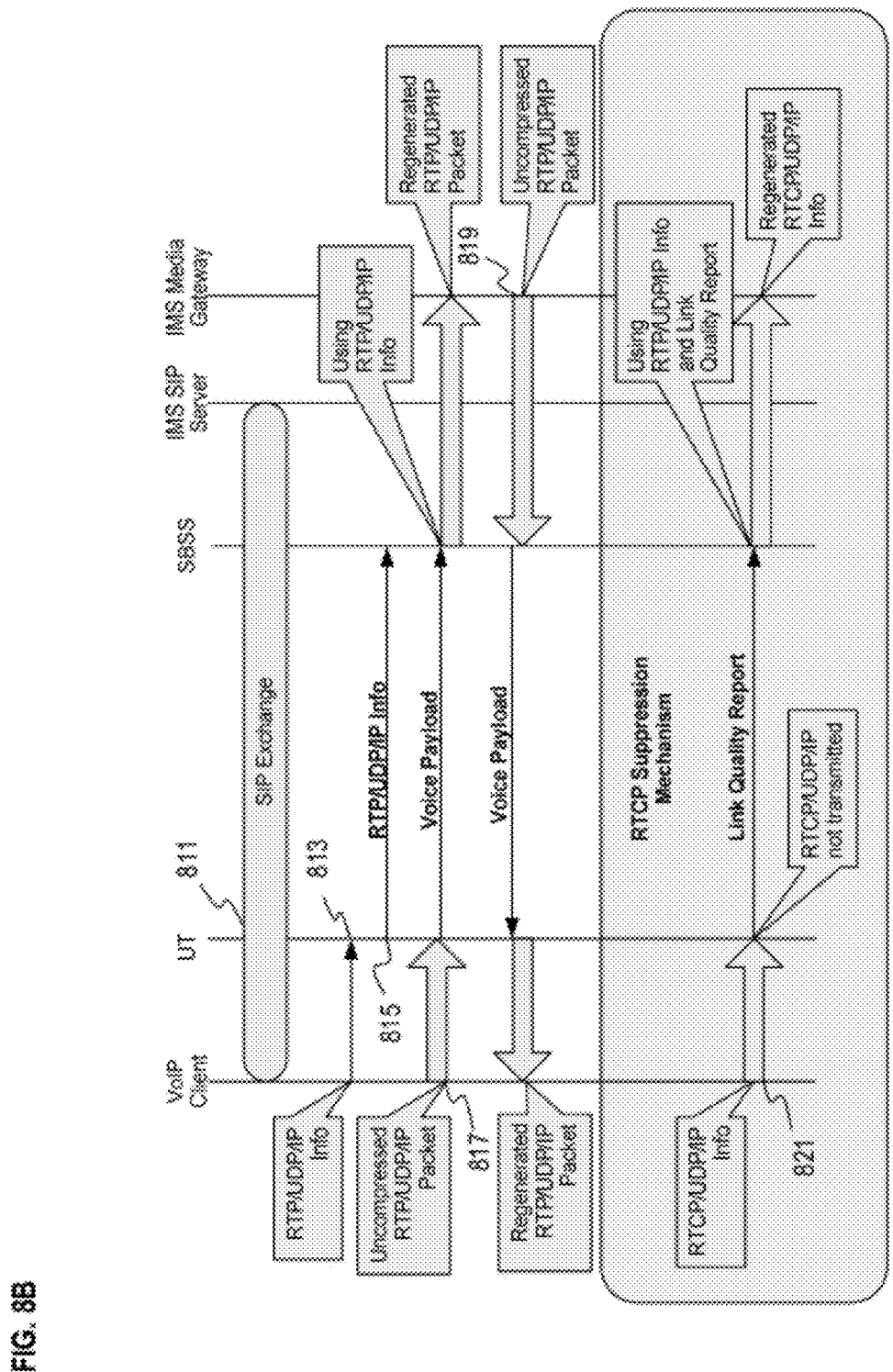

FIGS. 8A and 8B are, respectively, a flowchart and a ladder diagram of processes for providing link quality reports in support of a communications session, according to various exemplary embodiments. In a VoIP transaction utilizing SIP, in addition to transfer of media via Real-Time Protocol (RTP), there is transfer of side information, such as quality reports, via Real-Time Control Protocol (RTCP) protocol. For example, RTCP over UDP/IP can be employed for media control, wherein the RTCP provides feedback quality information to the source for the media carried within the RTP flow. Transfer of side information using RTCP requires additional bandwidth on the scarce mobile links. As described, the system 100 relies upon an approach that completely eliminates transfer of side information between transmitter (UT or SBSS depending on direction of media transfer) and receiver (SBSS or UT), thereby conserving resources on mobile links. The receiver creates these RTCP packets towards the client or server based on radio link quality, as seen at the physical layer.

RTCP is transported over UDP/IP and typically carries media control information. The characteristics of this flow are a Variable Packet Size (can be longer than the RTP payload) and that messages are transferred infrequently. RTCP defines different packet types—Sender Report, Receiver Report, Source Description, BYE and APP.

In step 801, a media session is established between the transmitter and the receiver. Next, the process examines the radio link quality at the physical layer, per step 803. Accordingly, this eliminates the need for providing radio link quality reports at the higher layer, such as the RTCP protocol (step 805). In step 807, the quality reports are regenerated based on the physical layer of the radio link.

In the exemplary scenario of FIG. 8B, the steps of 811-819 are similar to those steps 511-517 of the process of FIG. 5B. In addition, the process employs an RTCP suppression mechanism, whereby the VoIP client transmits, per step 821, a link quality report. As with the process of FIG. 5B, the packet(s) specifying such link quality report do not include the header information (e.g., RTCP/UDP/IP).

As another example of how VoIP sessions, particularly those involving the use of SIP, can be supported more efficiently relates to transmission errors, as next described.

Figure 9:
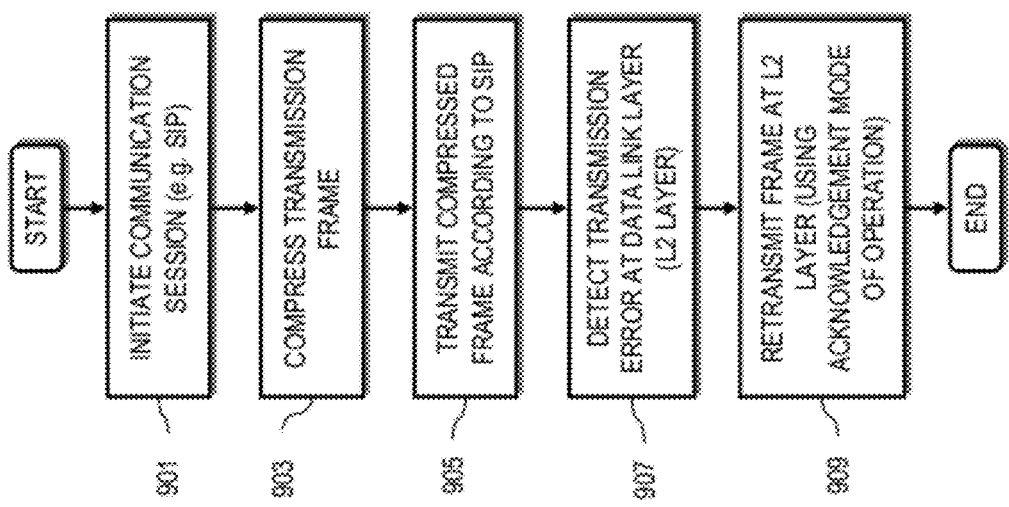
FIG. 9 is a flowchart of a process for handling transmission errors associated with a packetized voice call, according to various exemplary embodiments.

FIG. 9 is a flowchart of a process for handling transmission errors associated with a packetized voice call, according to various exemplary embodiments. SIP messages are textual in nature, resulting in long message lengths. Therefore, the transfer of these lengthy messages across the air interface (e.g., satellite air interface) results in a long call setup time. Traditionally, use of compression techniques such as SIGCOMP have been implemented to reduce the size of SIP messages, which can typically be about several hundred bytes long.

In step 901, a communication session (e.g., SIP session) is initiated; in which a transmission frame is generated. The process then compresses the transmission frame, as in step 903. This compressed frame is then transmitted according to SIP, per step 905. It is noted that typically SIP is carried over UDP, and messages carried over UDP are carried in unacknowledged mode at the data link layer. In step 907, a transmission error is detected at the data link layer (i.e., Layer 2 ("L2")). Rather than rely on the higher layer protocols to address the errors (i.e., using a retransmission scheme), the process retransmits at L2 using an acknowledgement mode of operation (step 909).

Figure 10A:
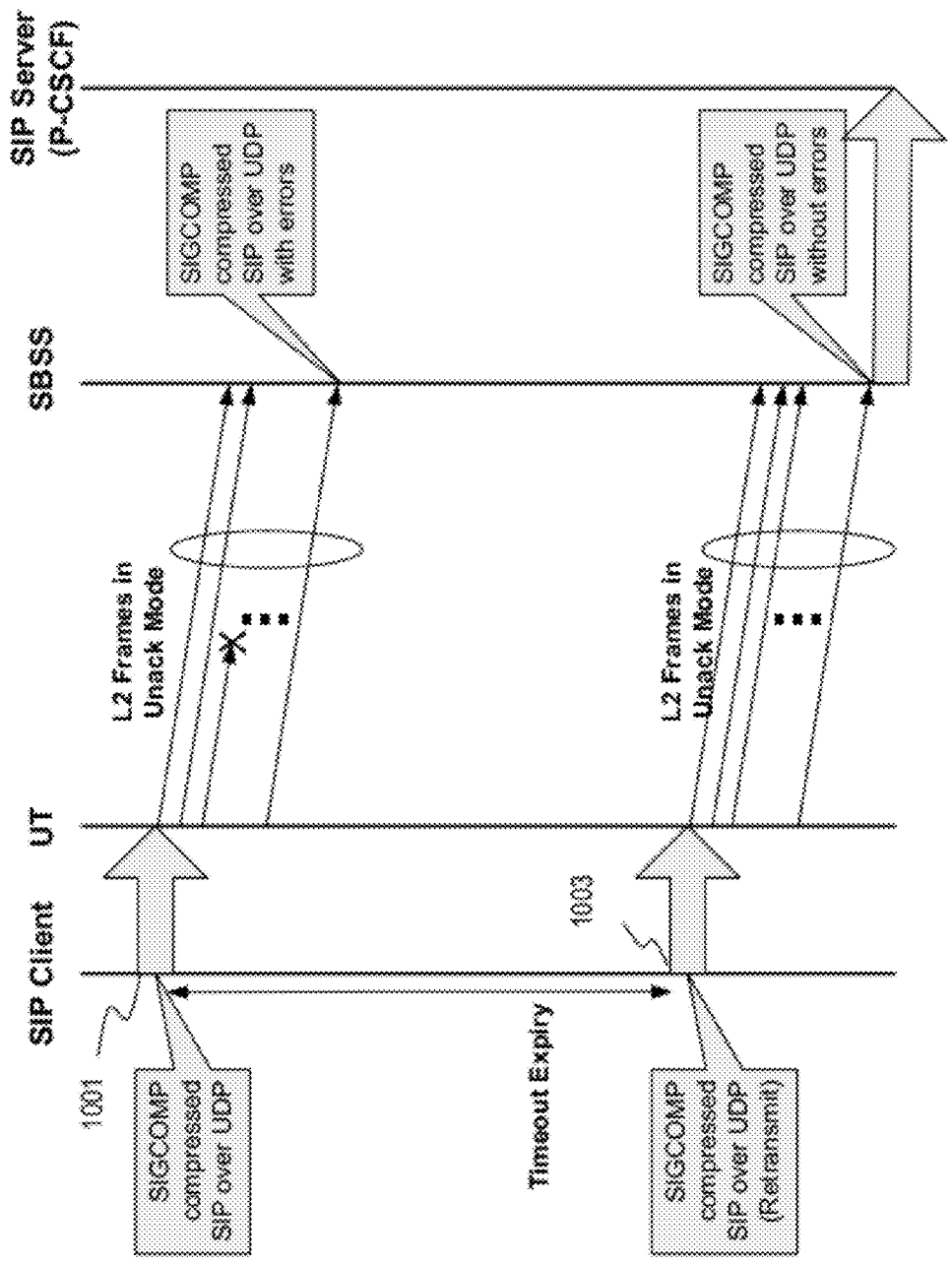
FIGS. 10A and 10B are, respectively, a ladder diagram of a conventional process for Session Initiation Protocol (SIP) over User Datagram Protocol (UDP) handling, and a ladder diagram of an enhanced process for SIP over UDP handling according to an exemplary embodiment.

To better appreciate this process, a conventional process for handling SIP over UPD is described with respect to FIG. 10A.

Figure 10B:
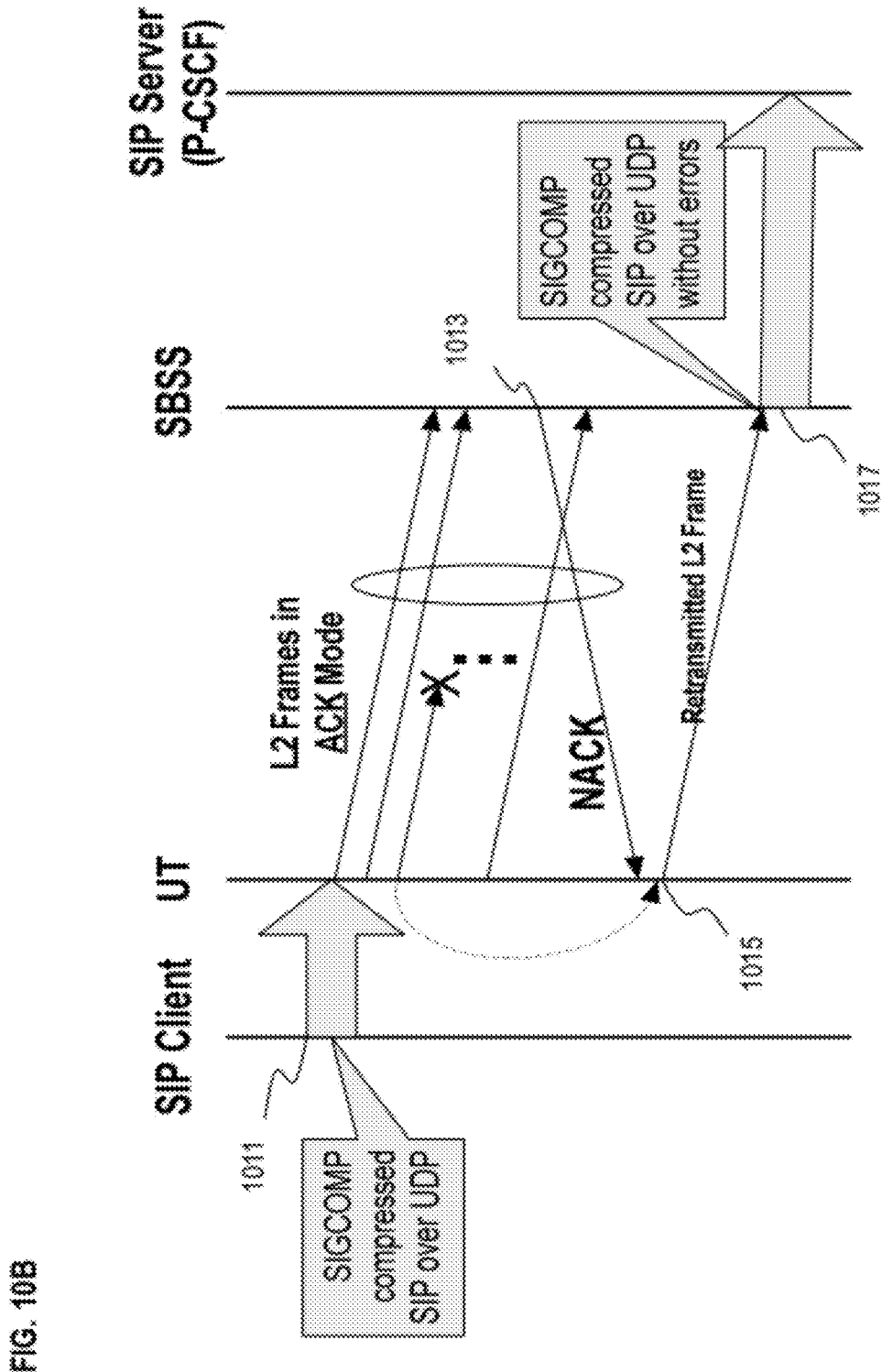

FIGS. 10A and 10B are, respectively, a ladder diagram of a conventional process for Session Initiation Protocol (SIP) over User Datagram Protocol (UDP) handling, and a ladder diagram of an enhanced process for SIP over UDP handling according to an exemplary embodiment. As shown in FIG. 10A, conventionally, the SIGCOMP compression is performed on the SIP message, which, as mentioned, are transported over UDP in unacknowledged mode at the data link layer (step 1001). The compressed SIP message is generally larger than a typical data link layer frame size. As a result, a single frame in error will result in the entire compressed SIP message to be retransmitted (step 1003). This not only results in increased call setup delay, but also wastes UT battery life because of power necessary to retransmit.

By contrast, the process of FIG. 10B relies upon the acknowledged mode operation at data link layer for SIP messages. In step 1011, the SIP client compresses the SIP messages, and the UT 111 sends the corresponding L2 frames in the acknowledgement mode to the SBSS 107. Consequently, upon detection of a transmission error at the data link layer, the SBSS 107 need only signal a negative acknowledgement (NACK) for the erroneous frame (step 1013). In response to the NACK signal, the UT 111 retransmits, as in step 1015, only the particular frame in error, as opposed to all the frames encompassing the SIP message. In step 1017, the SBSS 107 forwards the SIP message to the SIP server.

This process minimizes the impact of frame errors on the channel, thereby extending battery life in comparison to the conventional approach of FIG. 10A.

Figure 11:
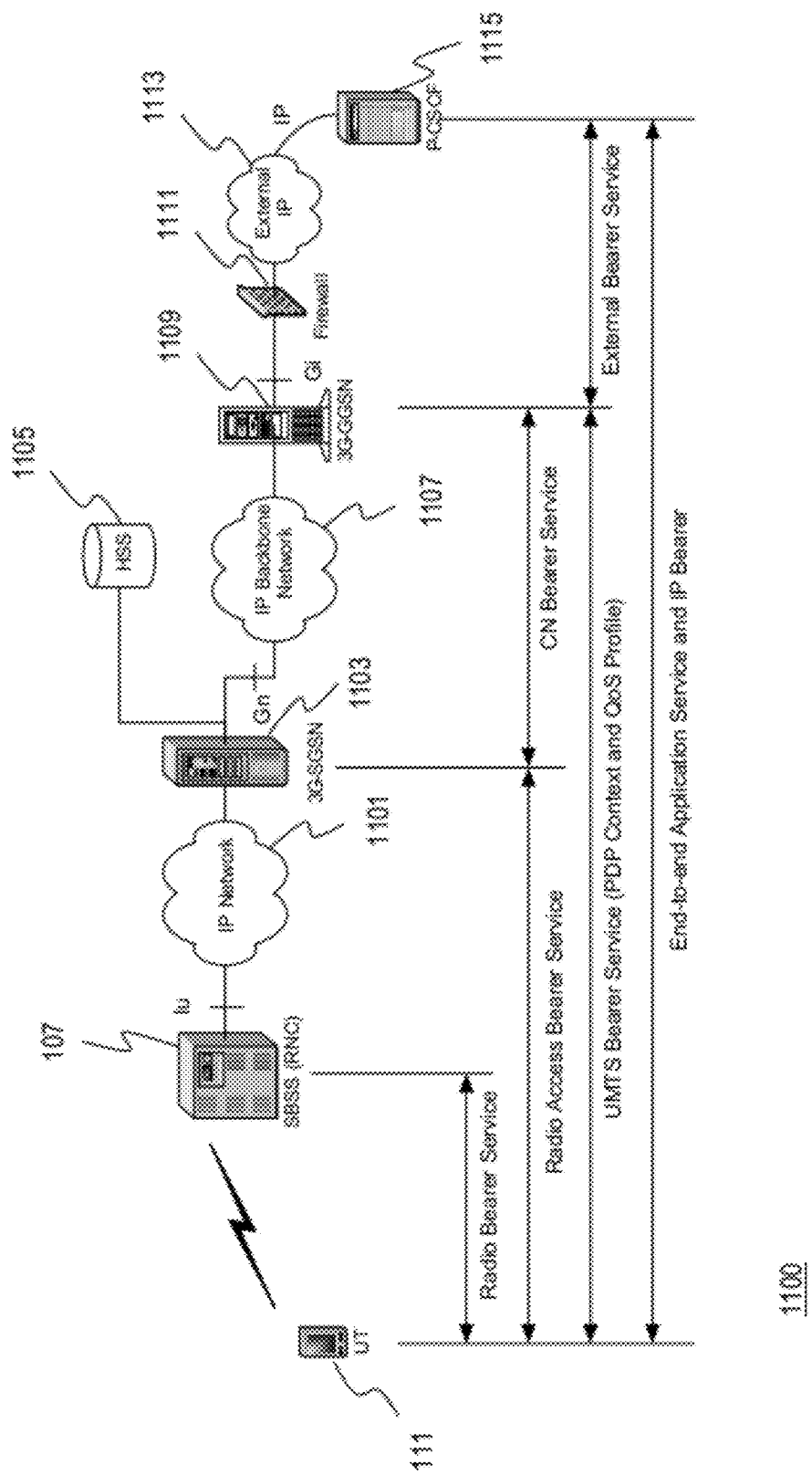
FIG. 11 is a diagram of a communication system having a quality of service (QoS) architecture, according to an exemplary embodiment.

FIG. 11 is a diagram of a communication system having a quality of service (QoS) architecture, according to an exemplary embodiment. Under this scenario, communication system 1100 provides Quality of Service (QoS) differentiation across various applications and users. The system 1100 provides an end-to-end QoS architecture. For delay sensitive traffic, the system 1100 provides resource reservation in the return link (link between UT 111 and SBSS 107). The UT 111 maps IP service application requirements to UMTS QoS parameters. The SBSS 107 implements admission control and maps radio access bearer (RAB) QoS to radio bearer QoS (L1/L2 parameters).

The SBSS 107 communicates over an IP network 1101 to a 3G-SGSN 1103, which maps QoS request to RAB QoS (RAB assignment parameters) based QoS profile. Home Subscriber System (HSS) 1105 stores information about the subscriber, including QoS profiles. 3G-SGSN 1103 has connectivity to an IP backbone network 1107 for communicating with a 3G-GGSN 1109, which maps IP packets to PDP context with different QoS characteristics using, for example, TFT packet filters (e.g., address, protocol, port, SPI, TOS). The GGSN 1109 interfaces with a firewall 1111 to reach an external IP network 1113. A Proxy Call Session Control Function (P-CSCF) 1115 (e.g., SIP server) has access to the external IP network 1113.

For guaranteed bit rate traffic, the system 1100 provides resource guarantees when actual traffic has enough backlog to warrant use of guaranteed resources—when actual traffic rate requirement is lower than guaranteed bit rate, the system 1100 distributes available bandwidth to other flows in the system in a manner proportional to the weight associated these other flows.

Figure 12:
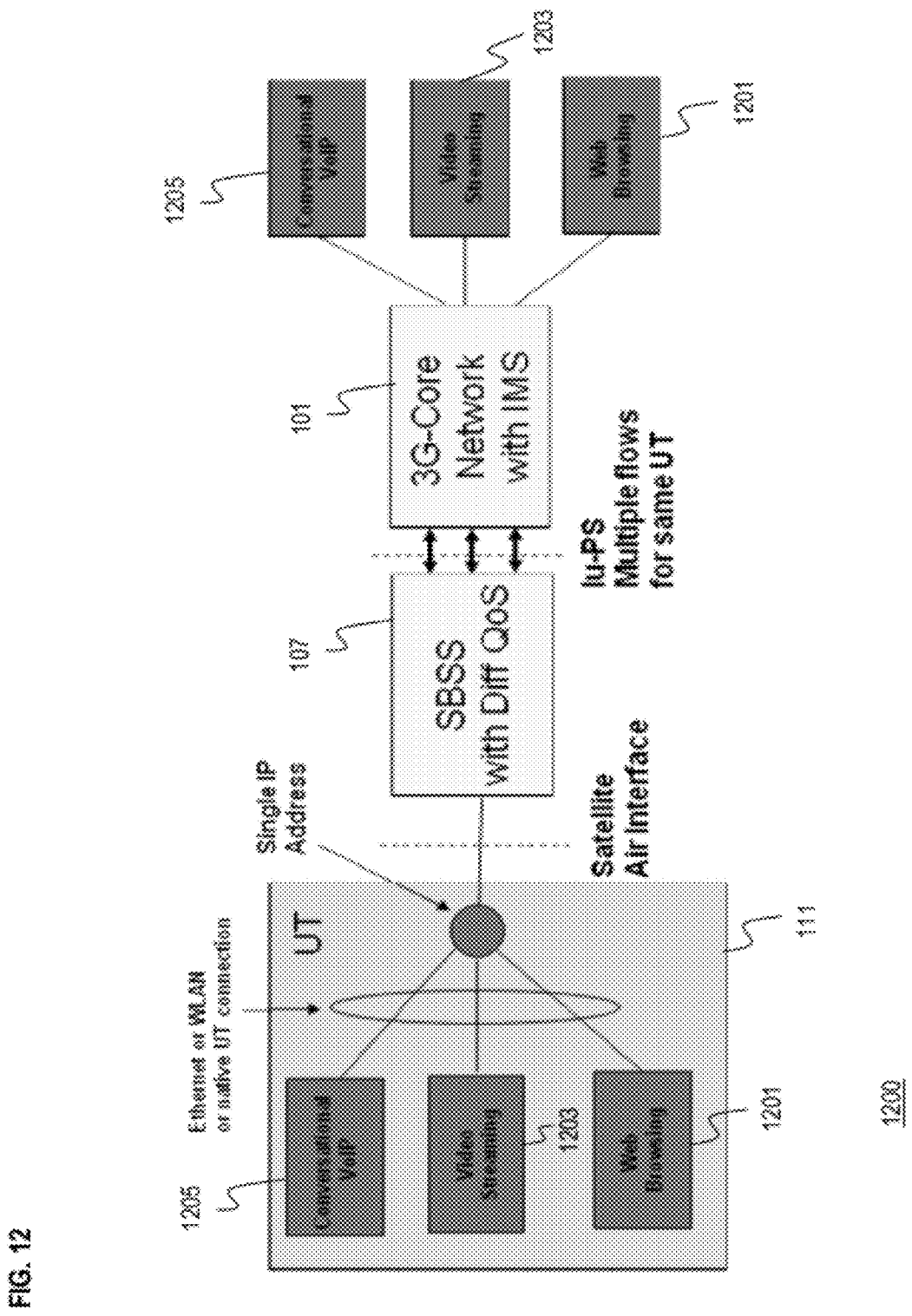
FIG. 12 is a diagram of a communication system for supporting multiple simultaneous flows for a user terminal with different QoS requirement, according to an exemplary embodiment.

Multiple simultaneous flows in the mobile satellite system based on terrestrial 3G architecture are illustrated FIG. 12.

FIG. 12 is a diagram of a communication system for supporting multiple simultaneous flows for a user terminal with different QoS requirement, according to an exemplary embodiment. Under this scenario, communication system 1200 provides for flows associated with different applications: a web browsing application 1201, a video streaming application 1203, and a VoIP application 1205. These applications 1201, 1203, and 1205, for the purposes of illustration, utilize different QoS parameters and are served by a common UT 111. As such, multiple flows can arrive simultaneously at the SBSS 107 according to differing QoS requirements, and be supplied to the UT 111.

Given the fact that multiple flows are transported over the satellite air interface, such flows can processed to achieve better spectral efficiency, as detailed below.

Figure 13:
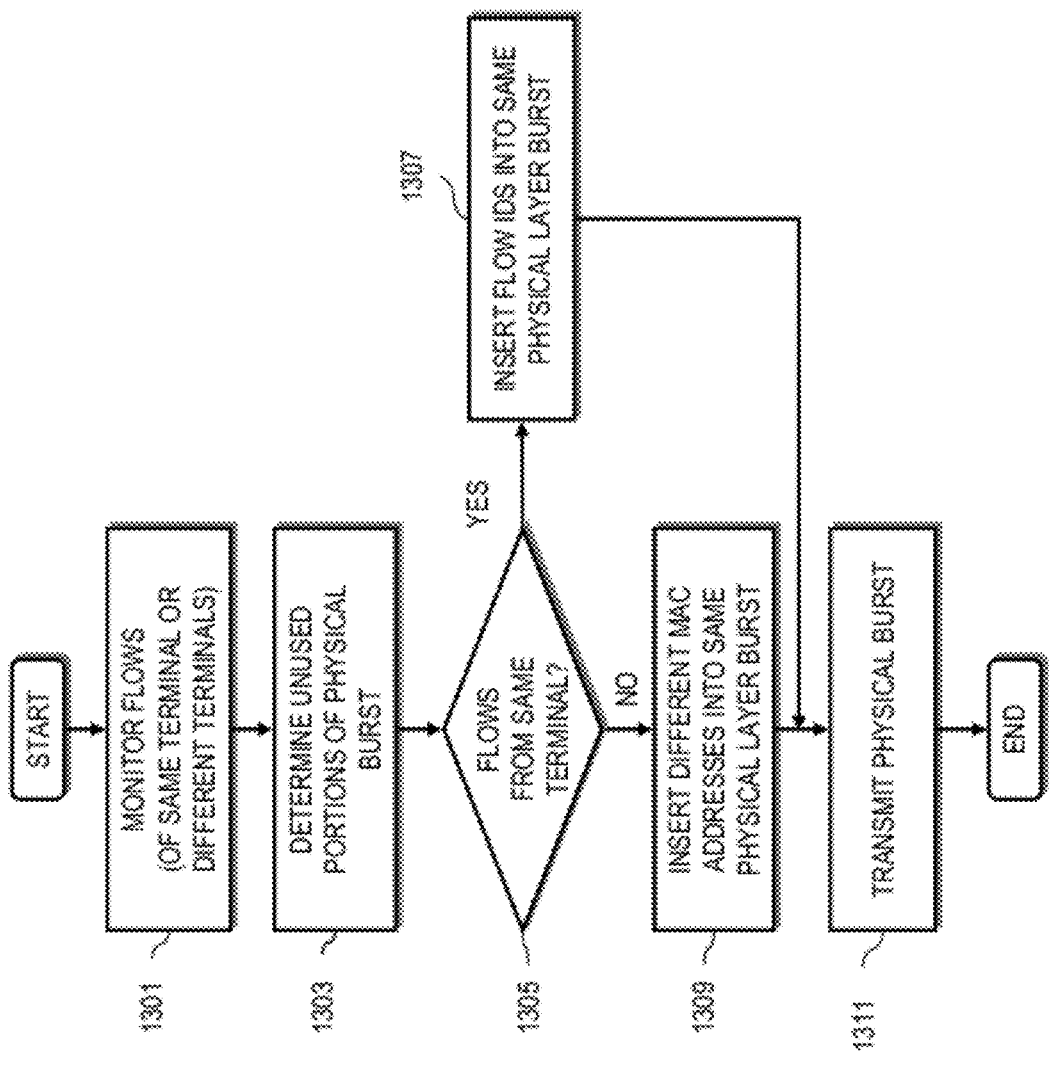
FIG. 13 is a flowchart of a process for efficiently multiplexing flows, according to various exemplary embodiments.

FIG. 13 is a flowchart of a process for efficiently multiplexing flows, according to various exemplary embodiments. The system 100 permits multiplexing of multiple flows belonging to different users in the same physical burst to maximize spectral efficiency. In step 1301, the flows are monitored; these flows can be for the same terminal or different terminals). The process determines any unused portions of the physical burst, per step 1303. It is then determined whether the flows are for the same (or common) terminal, as in step 1305. If the flows are for the same terminal, flow identifiers (IDs) are inserted into the same physical layer burst (step 1307). However, if the flows are not from the same terminal, different identifiers (e.g., MAC addresses) corresponding to the terminals are inserted, as in step 1309, into the same physical layer burst. The burst is subsequently transmitted, per step 1311. The formats of this physical layer burst is shown in FIGS. 14A and 14B.

Figure 14A:
FIGS. 14A-14C are diagrams of exemplary frame structures for providing multiplexing of multiple flows, according to various exemplary embodiments.
Figure 14B:
Figure 14C:
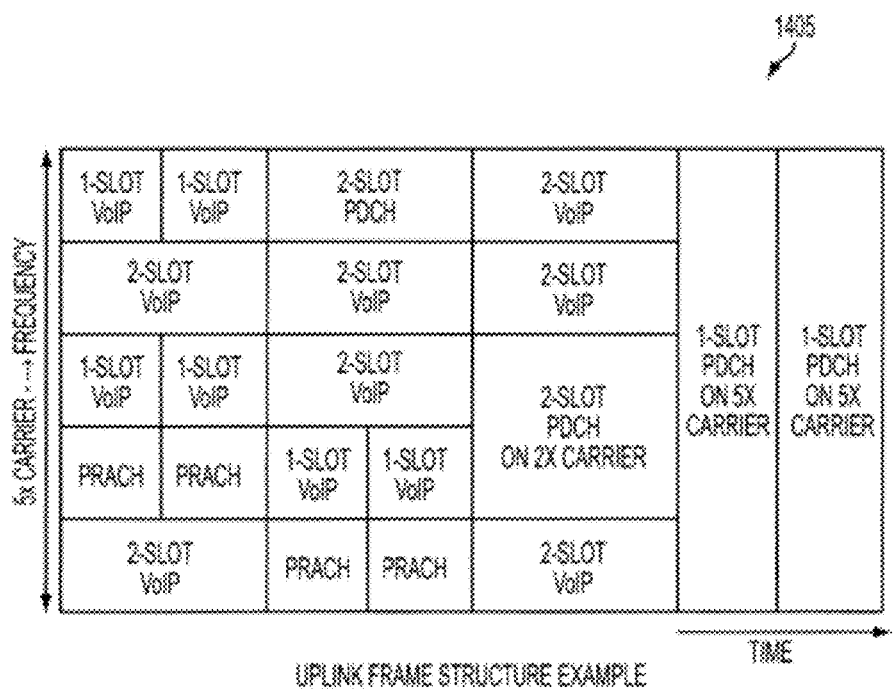

FIGS. 14A-14C are diagrams of exemplary frame structures for providing multiplexing of multiple flows, according to various exemplary embodiments. By way of example, in FIG. 14A, unused portions of a physical (PHY) burst 1401 in, e.g., the downlink (from the SBSS 107 to the UT 111) can be allocated to eligible flows belonging to potentially different UTs 111 as determined by a scheduler. Physical bursts in this case may carry multiple unique identifiers (e.g., MAC addresses) if the flows correspond to different UTs 111. In this example, the physical burst 1401 supports three different UTs 111. Accordingly, the burst 1401 provides each UT 111 (e.g., UT1, UT2, and UT3) with an identifier (e.g., MAC address) and associated payload. Thus, burst 1401 includes the following fields: UT1 MAC ID and payload for UT1; UT2 MAC ID and payload for UT2; and UT3 MAC ID and payload for UT3.

As seen in FIG. 14B, in the uplink (i.e., in the direction of UT to SBSS), the system 100 permits multiplexing of multiple flows belonging to same user terminal 111 in a PHY burst 1403. In this case, unused portion of the physical burst 1403 is allocated to suitable flows of the same UT 111, as determined by the scheduler. The physical burst 1403 can specify multiple flow identifiers (e.g., addresses) for three flows to UT1: Flow ID1, Flow ID2, and Flow ID3.

In another embodiment, a frame structure 1405 of FIG. 14C can support efficient multiplexing of flows belonging to different traffic classes, terminal types (e.g., with different transmit capabilities), and burst types.

Figure 15:
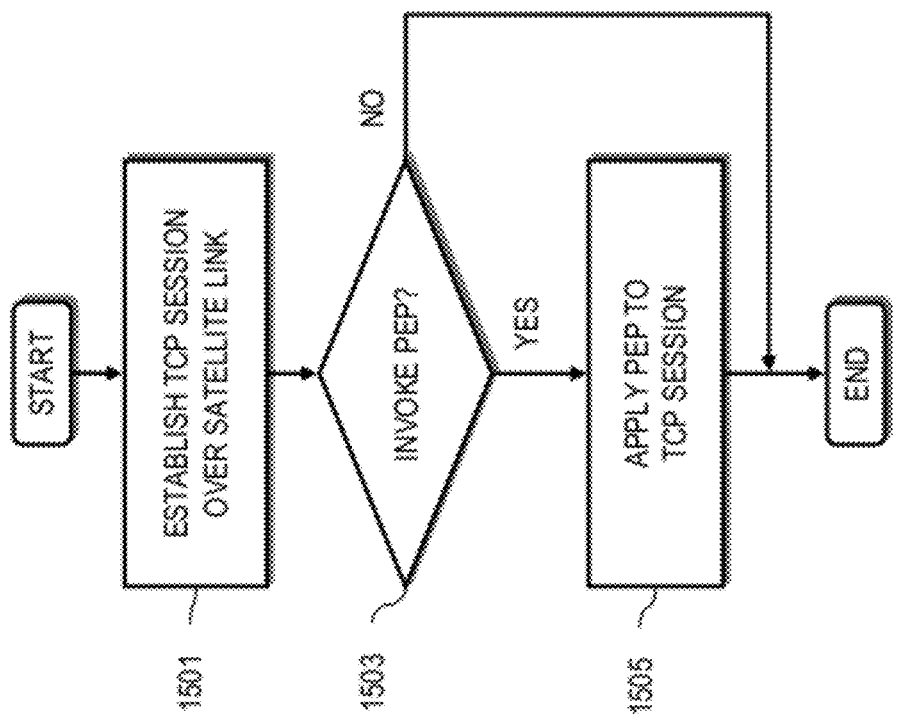
FIG. 15 is a flowchart of a process for utilizing performance enhancing proxy (PEP) functions, according to an exemplary embodiment.

FIG. 15 is a flowchart of a process for utilizing performance enhancing proxy (PEP) functions, according to an exemplary embodiment. The system 100, as a 3G mobile satellite system, can be designed to employ Performance Enhancing Proxies (PEP) to improve throughput for various applications—e.g., Transmission Control Protocol (TCP) based applications. Because much of today's networks are either operating with or are required to interface with the Transmission Control Protocol/Internet Protocol (TCP/IP) suite, attention has been focused on optimizing TCP/IP based networking operations. As the networking standard for the global Internet, TCP/IP has earned such acceptance among the industry because of its flexibility and rich heritage in the research community. The transmission control protocol (TCP) is the dominant protocol in use today on the Internet. TCP is carried by the Internet protocol (IP) and is used in a variety of applications including reliable file transfer and Internet web page access applications.

PEP functions perform a general class of functions termed "TCP spoofing," in order to improve TCP performance over impaired (i.e., high latency or high error rate) links. TCP spoofing involves an intermediate network device (the performance enhancing proxy (PEP)) intercepting and altering, through the addition and/or deletion of TCP segments, the behavior of the TCP connection in an attempt to improve its performance. Conventional TCP spoofing implementations include the local acknowledgement of TCP data segments in order to get the TCP data sender to send additional data sooner than it would have sent if spoofing were not being performed, thus improving the throughput of the TCP connection. Generally, conventional TCP spoofing implementations have focused simply on increasing the throughput of TCP connections either by using larger windows over the link or by using compression to reduce the amount of data which needs to be sent, or both.

Under this exemplary application, in step 1501, a TCP session is established over the satellite link (i.e., from the SBSS 107 to the UT 111). Depending on the direction of traffic, the SBSS 107 or the UT 111 can invoke the PEP function. In step 1503, it is determined whether to apply PEP. If so, the PEP function is invoked, as in step 1505. The PEP functionality is invoked when the SBSS 107 has visibility to TCP headers (since this is necessary for protocol spoofing).

However, in situations where IPSec is used and TCP headers are not visible, the system 100 relies on MAC layer protocol enhancements that does not require visibility to TCP headers. In this embodiment, the MAC layer provides speculative grants to the UT 111 when resources are available in the system 100. These speculative grants are used by UT 111 to transmit in, e.g., the uplink without explicitly requesting for radio resources. This eliminates the round-tip delay involved in request/grant exchange between UT 111 and SBSS 107.

Figure 17:
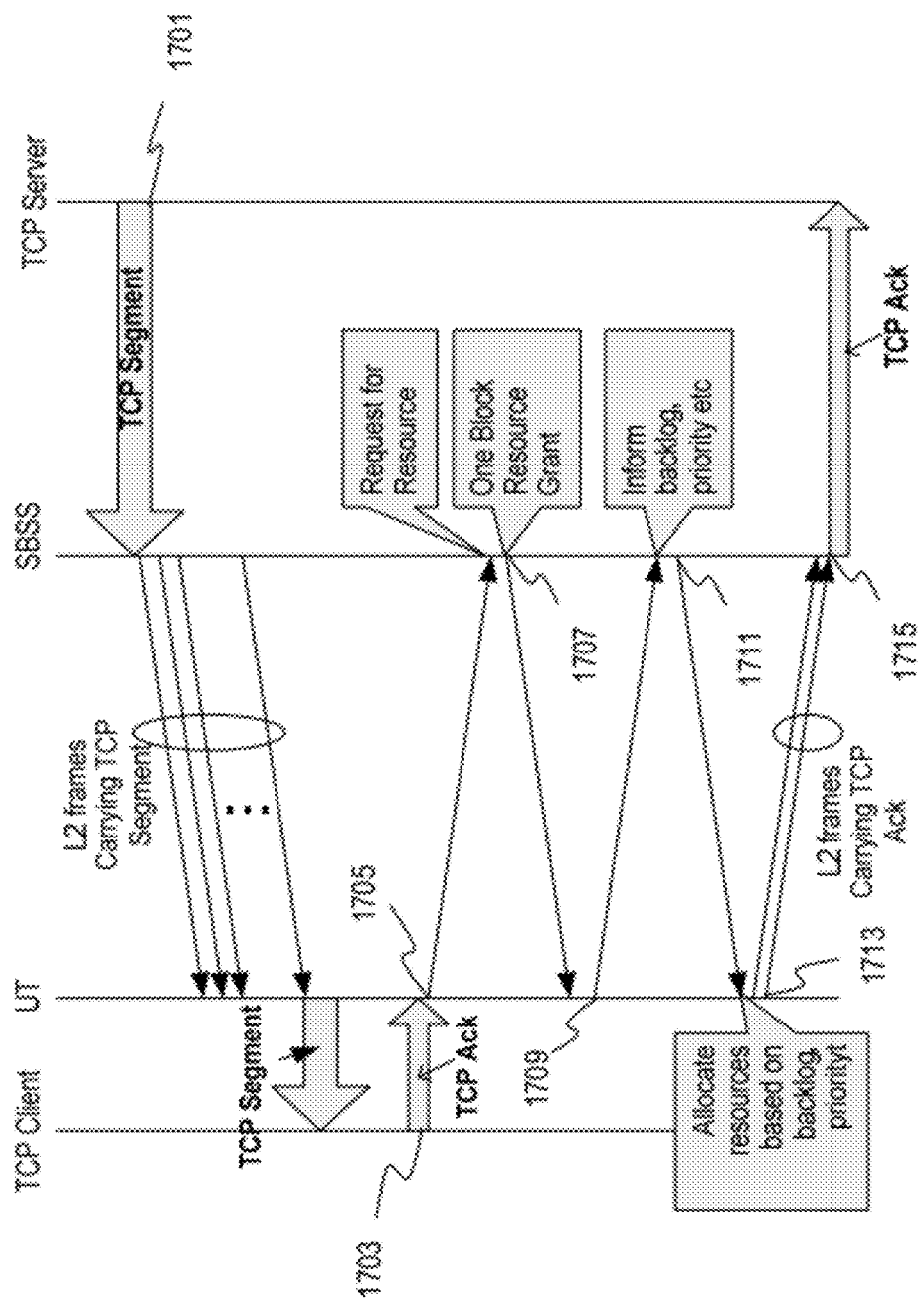
FIG. 17 is a ladder diagram of a typical Medium Access Control (MAC) protocol exchange over a satellite link.
Figure 18:
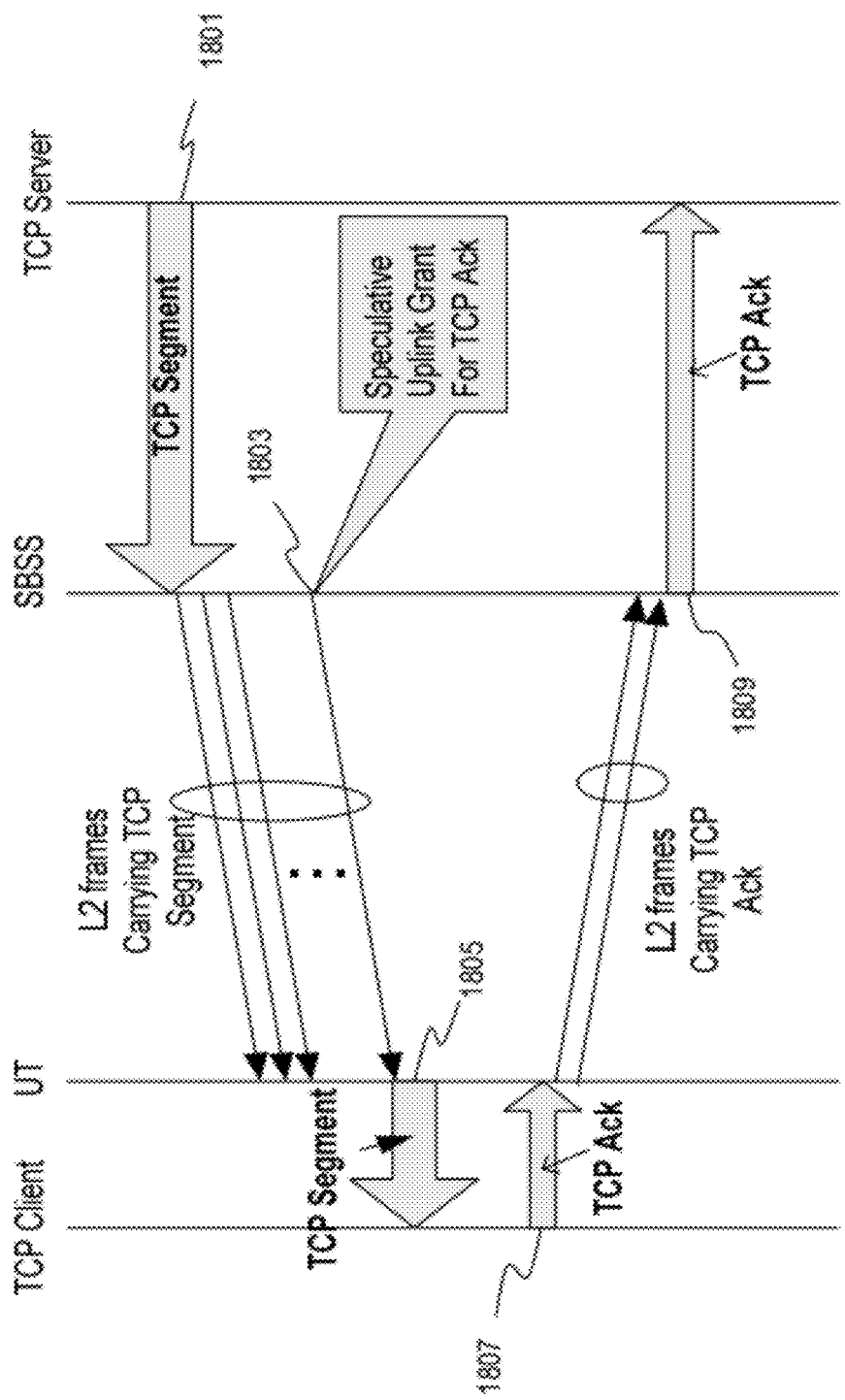
FIG. 18 is a ladder diagram of a MAC protocol exchange over a satellite link in which delay is reduced, according to an exemplary embodiment.

FIG. 17 illustrates impact of using typical terrestrial GPRS MAC protocols, and FIG. 18 illustrates the enhancement in performance due to the PEP functionality. TCP provides reliable, in-sequence delivery of data between two TCP entities. These entities set up a TCP connection, using a conventional TCP three-way handshake and then transfer data using a window based protocol with the successfully received data acknowledged.

Figure 16:
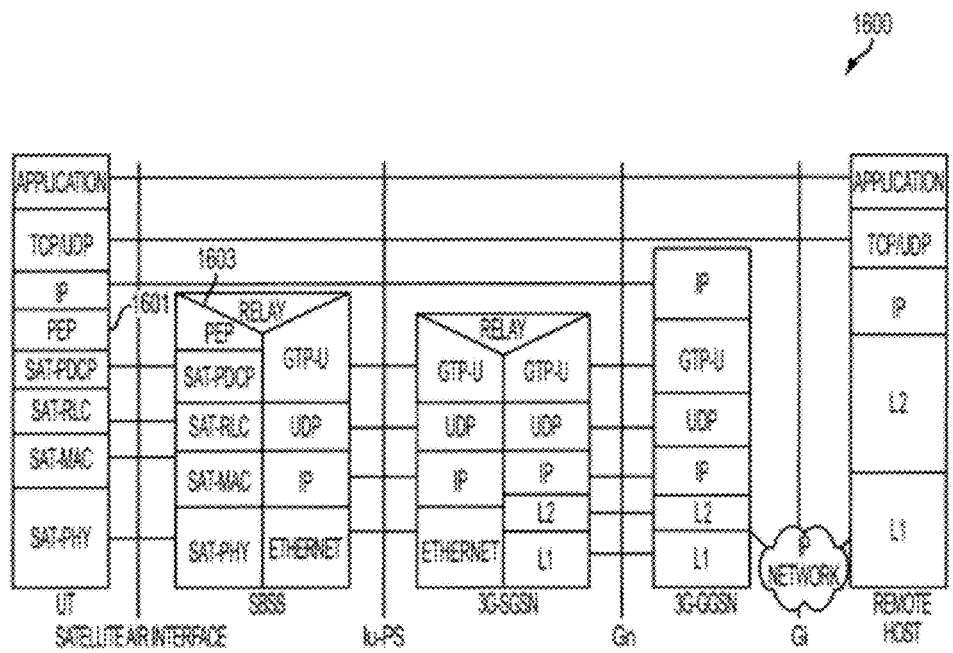
FIG. 16 is a diagram of a protocol architecture including PEP functions, according to an exemplary embodiment.

FIG. 16 is a diagram of a protocol architecture including PEP functions, according to an exemplary embodiment. A protocol architecture 1600 resembles that of architecture 300 of FIG. 3, and can be adopted by the system 100. As seen, a PEP layer 1601, 1603 is injected into the protocol architecture 1600 in a manner that does not impact the core network protocol architecture. The PEP function can be entirely absorbed in the Access Stratum protocol architecture. PEP function monitors TCP transactions and speeds up transfer of TCP segments across air interface when resources are available. It also prevents TCP windows from collapsing due to errors on the radio links.

FIG. 17 is a ladder diagram of a typical Medium Access Control (MAC) protocol exchange over a satellite link. This process begins, per step 1701, with a TCP server outputting a TCP segment to the SBSS 107, which generates multiple L2 frames for transmission over the satellite link to the UT 111. These L2 frames are then used to regenerate the TCP segment, which is then provided to the TCP client. The TCP client subsequently acknowledges, as in step 1703, the received TCP segment by issuing a TCP ACK message. This ACK message triggers a resource allocation process, in which the UT 111 requests resources for sending the ACK message to the SBSS 107. In step 1705, the UT 111 submits a request for resource, and the SBSS responds with a resource grant (step 1707). Per steps 1709 and 1711, the UT 111 provides information relating to the resource request (e.g., backlog, priority, etc.) to the SBSS 107, which then sends a grant based on this information. Thereafter, the UT 111 can send the TCP ACK message over the L2 frames to the SBSS 107, as in step 1713. Lastly, the SBSS 107 forwards the TCP ACK message to the TCP server. In this process, the resource allocation procedure for simply forwarding the TCP ACK is expensive, introducing significant delay. In recognition of this drawback, an approach is provided (shown in FIG. 18) that minimizes the delay stemming from the resource allocation procedure.

FIG. 18 is a ladder diagram of a MAC protocol exchange over a satellite link in which delay is reduced, according to an exemplary embodiment. In step 1801, the TCP server sends a TCP segment, resulting in the generation and transmission of L2 frames from the SBSS 107 to the UT 111 as in the process of FIG. 17. Unlike this process, in step 1803, recognizing that an acknowledgement message will be forthcoming, the SBSS 107 submits a speculative uplink grant for the anticipated TCP ACK.

In step 1805, the UT 111 forwards the TCP segment to the TCP client. After receipt of the TCP segment, the TCP client, per step 1807, submits a TCP ACK. At this point, the UT 111 can immediately forward the TCP ACK over the satellite link, as resources had been pre-allocated. In step 1809, the TCP ACK is received by the SBSS 107 and forwarded to the TCP server. The typical resource allocation procedure is avoided in this process, thereby reducing delays associated with such a procedure.

Figure 19:
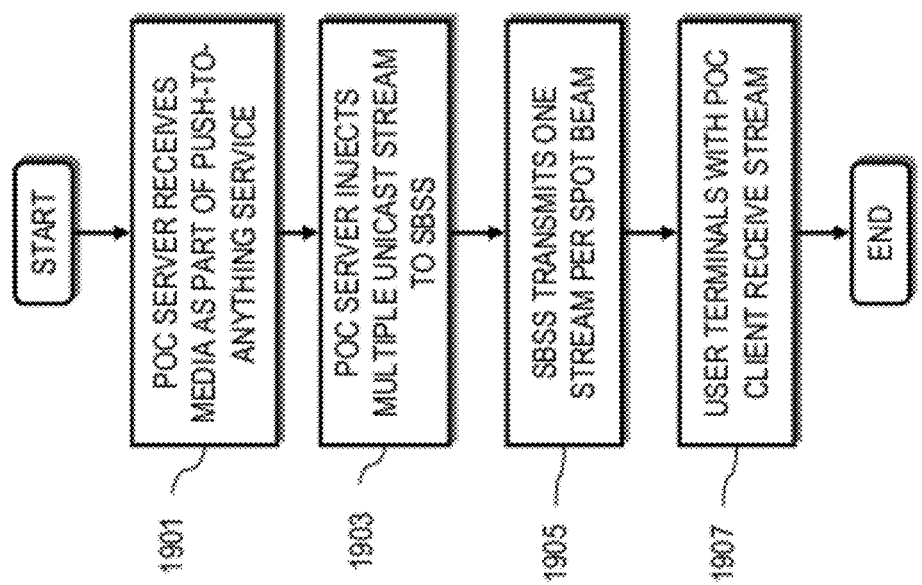
FIG. 19 is a flowchart of a process for efficiently utilizing resources to provide push-to-anything, according to an exemplary embodiment.
Figure 20:
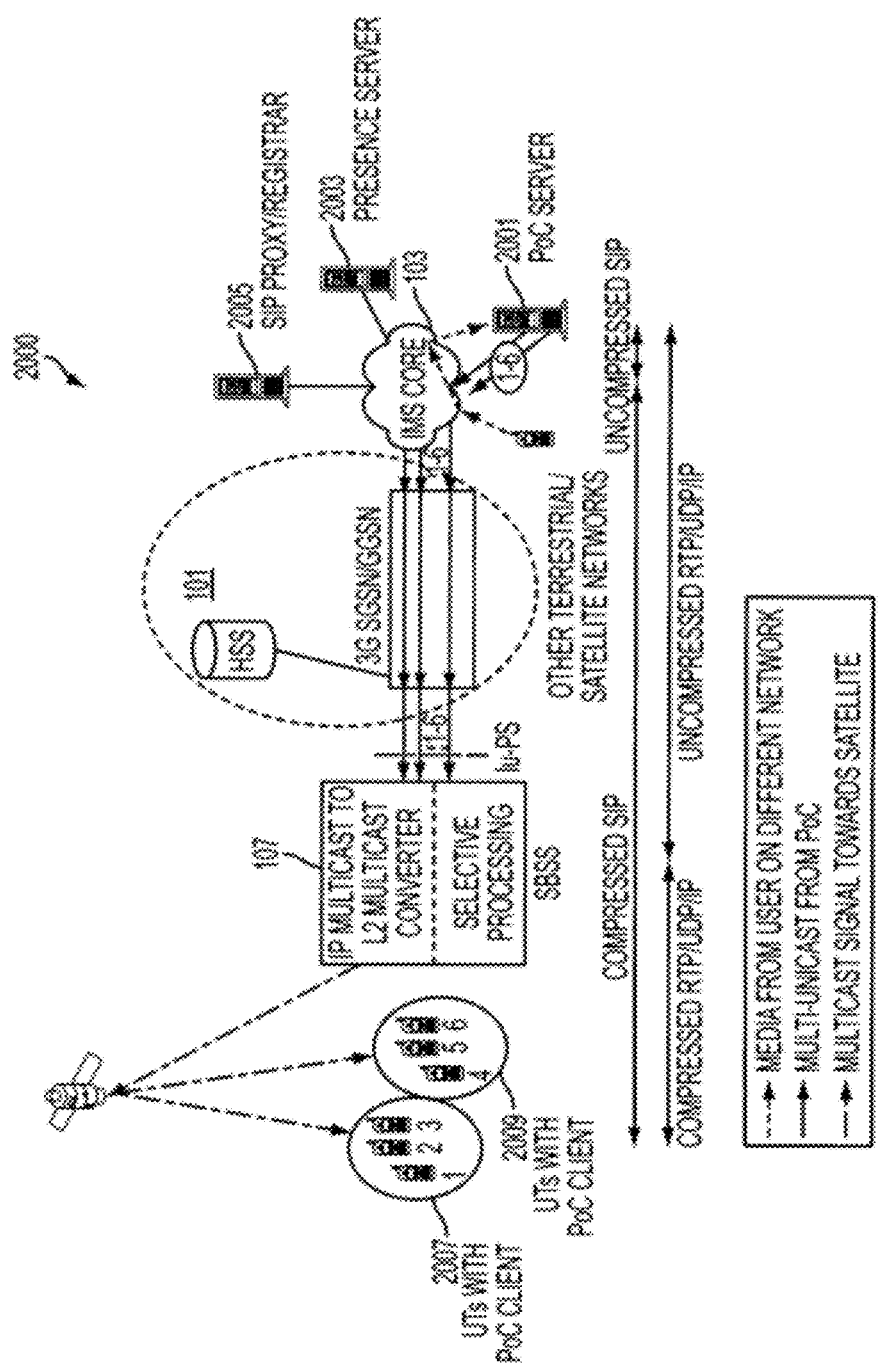
FIG. 20 is a diagram of a communication system capable of providing push-to-anything, according to an exemplary embodiment.

FIG. 19 is a flowchart of a process for efficiently utilizing resources to provide push-to-anything, according to an exemplary embodiment. The system 100, in certain embodiments, also permits carriage of resource efficient Push-to-Anything services. Under this scenario, the end-to-end architecture of system 100 relies upon terrestrial IP multimedia subsystem (IMS) elements such as PoC servers (as shown in FIG. 20). By way of example, the push-to-anything process of FIG. 19 is explained with respect to the architecture of FIG. 20.

With the architecture 2000, the IMS core 103 includes one or more PoC servers 2001, a presence server 2003, and a SIP proxy/registrar server 2005. The presence server 2003 provides information on the availability of a particular user to receive the PoC communication. The SIP proxy/registrar server 2005 assists with establishing SIP sessions.

In step 1901, the POC server 2001 receives media as part of the push-to-anything service. Next, the PoC server 2001 injects, as in step 1903, multiple unicast streams towards the SBSS 107. It is recognized that the radio resource usage can be made significantly more efficient for the satellite link. Namely, the SBSS 107 need only transmit one such stream, per step 1905, in a given spot-beam (e.g., beams 2007 and 2009), thereby significantly saving radio resources and satellite power. In step 1907, the user terminal (with the PoC client) receives the single stream.

A further mechanism for achieving spectral efficiency over the satellite air interface involves examining the channel conditions.

Figure 21:
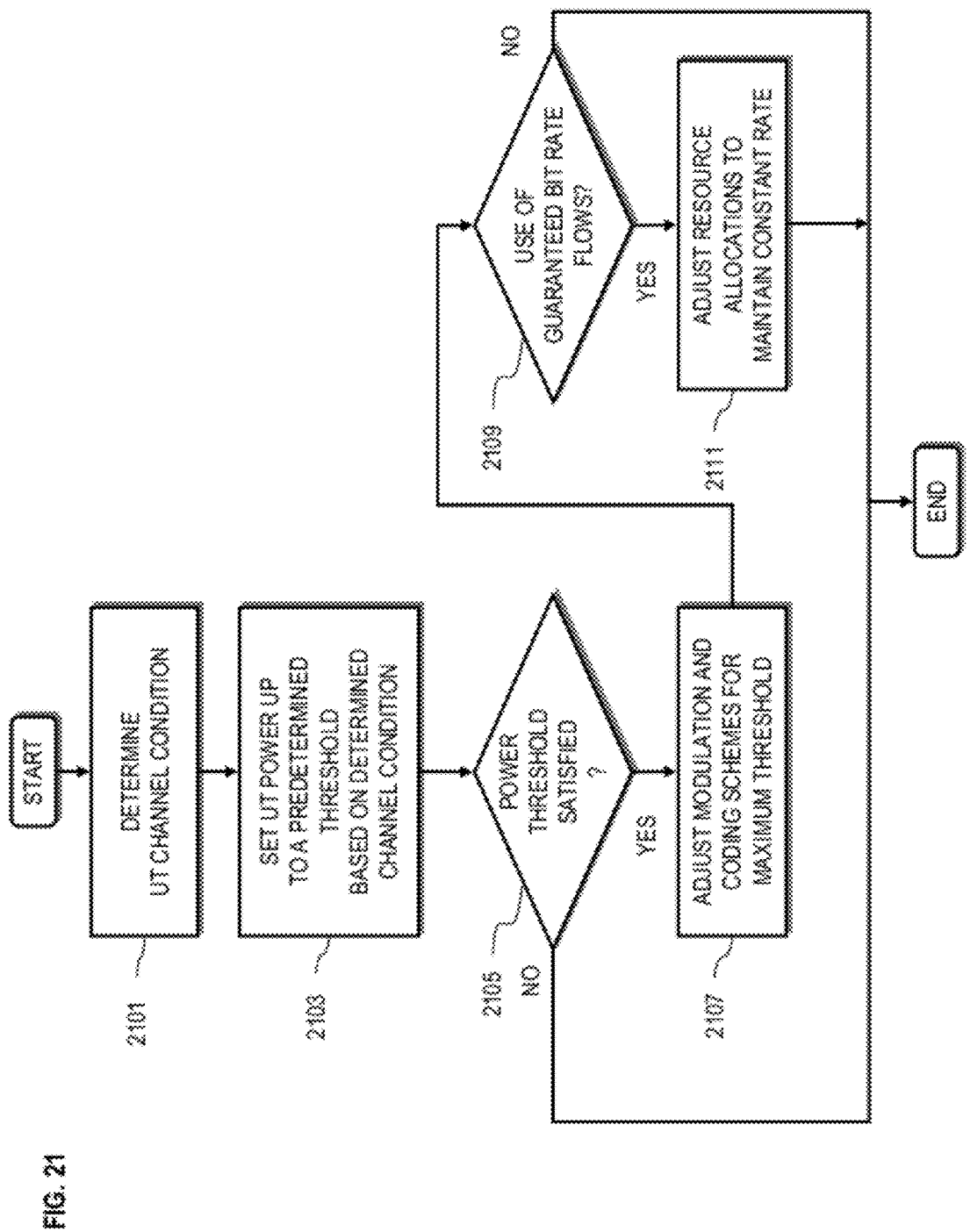
FIG. 21 is a flowchart of a process for providing dynamic link adaptation, according to an exemplary embodiment.

FIG. 21 is a flowchart of a process for providing dynamic link adaptation, according to an exemplary embodiment. This process utilizes dynamic link adaptation whereby the transmit power, modulation scheme, coding scheme and resource allocation are adjusted based on UT channel condition. In step 2101, the UT channel condition is determined. After this determination, the UT power can be set, as in step 2103. For example, to maximize throughput, UT power is adjusted up to a threshold so as to mitigate an impaired channel condition. When UT transmit power reaches a threshold (as determined in step 2105), modulation and coding schemes are adjusted to maximize throughput, per step 2107. In certain applications, guaranteed bit rate flows may be supported. As such, for guaranteed bit rate flows (as determined in step 2109), resource allocations can also be adjusted so as to keep the information rate constant, as in step 2111.

Figure 22:
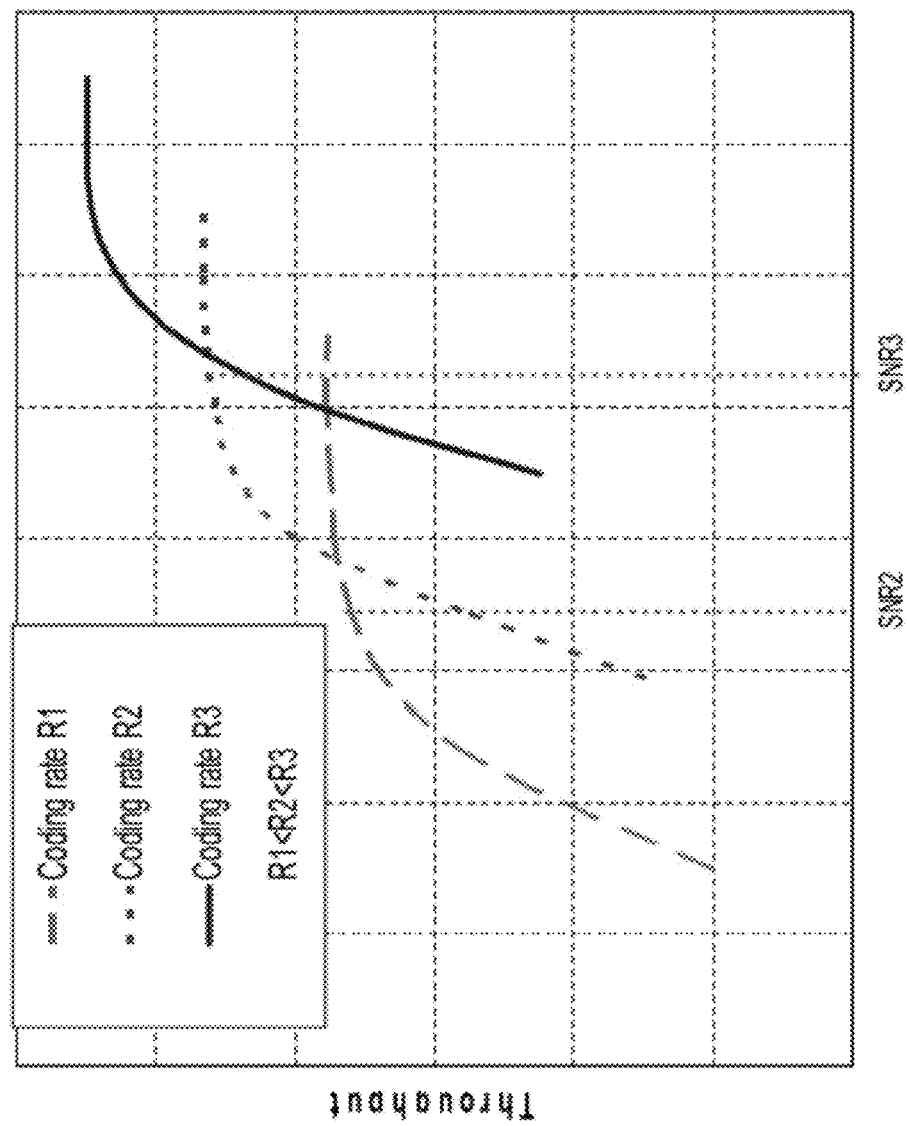
FIG. 22 is a diagram of a graph show performance of a dynamic link adaptation mechanism, according to an exemplary embodiment.

The performance enhancement obtain through the application of the above scheme is shown in FIG. 22.

FIG. 22 is a diagram of a graph show performance of a dynamic link adaptation mechanism, according to an exemplary embodiment. Specifically, graph 2200 shows three different coding rates, R1, R2, and R3 (in ascending order of rates). As seen, throughput can be maximized for each of the rates after a particular signal-to-noise (SNR) level.

Figure 23:
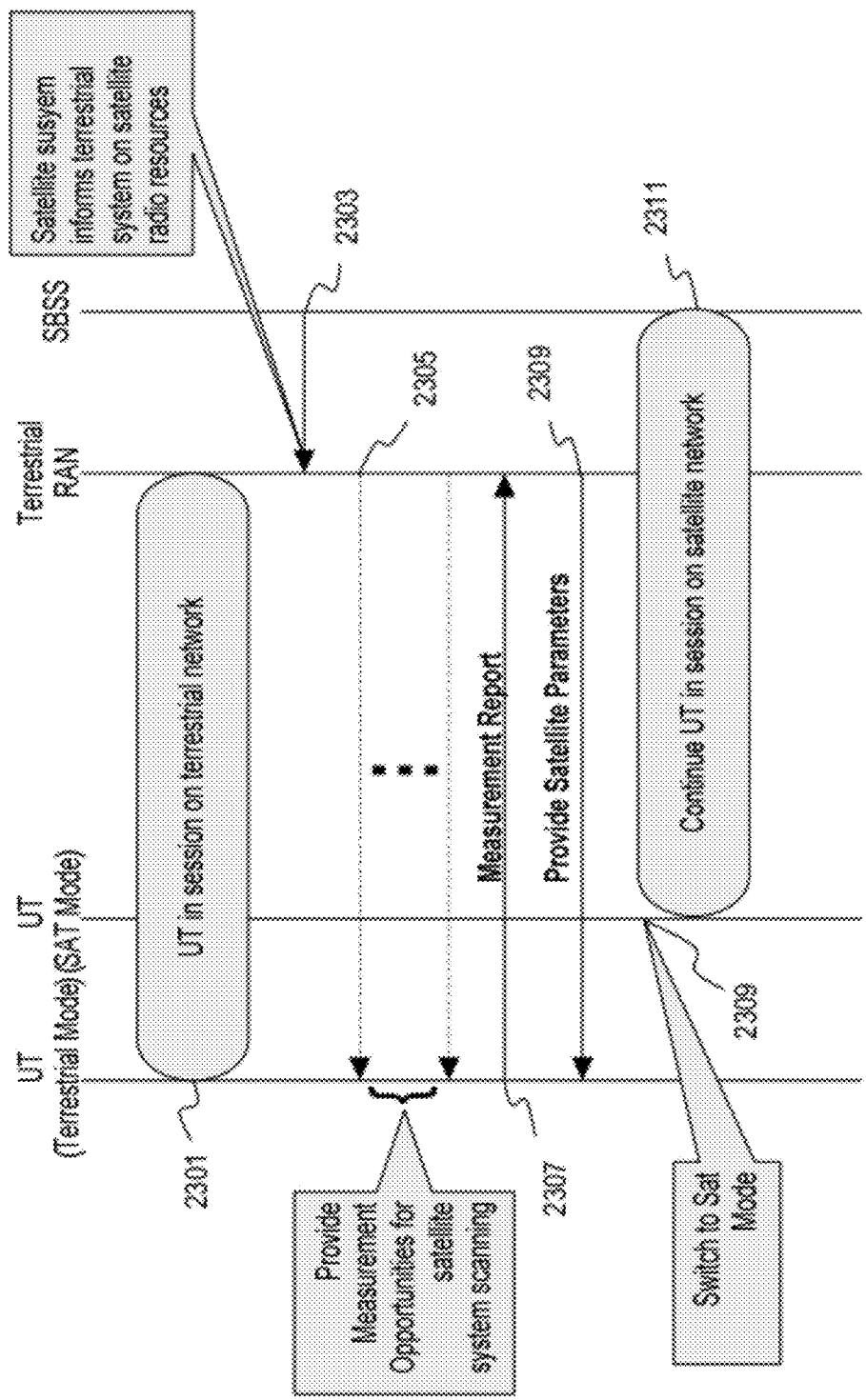
FIG. 23 is a ladder diagram of a handover process between a terrestrial domain and a satellite domain, according to an exemplary embodiment.

FIG. 23 is a ladder diagram of a handover process between a terrestrial domain and a satellite domain, according to an exemplary embodiment. In the example, the system 100 (of FIG. 1B) supports in-session handovers between terrestrial and satellite domains via coordination of resources via, e.g., a central resource manager (not shown). In step 2301, the UT 111 is in session with terrestrial network 113. In step 2303, the SBSS 107 communicates with the terrestrial network 113 to convey information regarding the satellite radio resources. When the UT 111 is in session on a terrestrial network (e.g., network 113), the terrestrial network 113 provides opportunities for the UT 111 to make measurements of adjacent terrestrial cells as well as the overlaid satellite spot-beams (step 2305). Information about satellite spot-beams is provided to the terrestrial RAN 113 by the central resource manager in form of measurement reports, per step 2307. In turn, the terrestrial network 113 supplies the satellite parameters, as in step 2309.

Based on measurement reports received by the terrestrial network 113 (step 2305), the terrestrial network decides whether the user terminal should be handed over to a terrestrial cell or satellite spot-beam (step 2309). If the decision is a satellite spot-beam, then the network 113 informs user terminal 111 about the details of the satellite spot-beam. The user terminal 111 then continues the session, as in step 2311, with the satellite system and abandons the terrestrial system 113.

Figure 24:
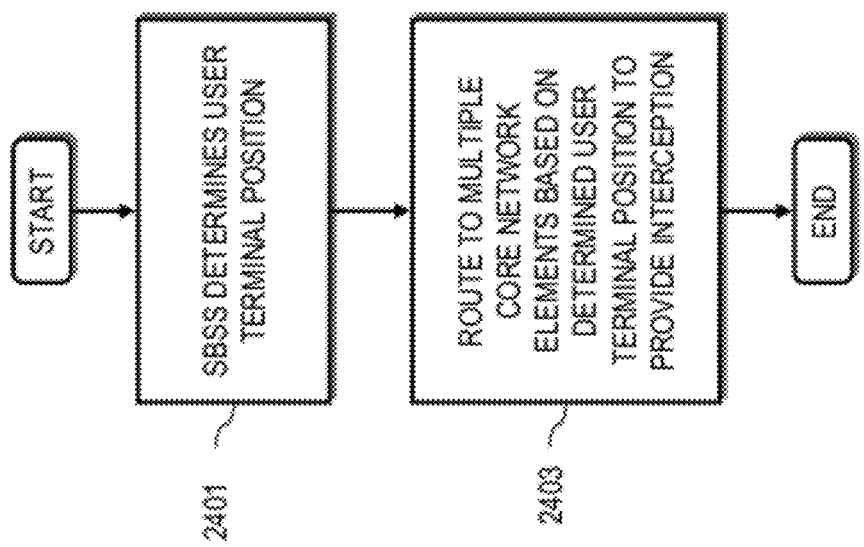
FIG. 24 is a flowchart of a process for providing legal interception handling, according to an exemplary embodiment.

FIG. 24 is a flowchart of a process for providing legal interception handling, according to an exemplary embodiment. Satellite spot-beams generally cover a relatively wide area (e.g., several hundred kilometers in radius) compared to a terrestrial cell (e.g., 2-3 km radius). Therefore a satellite spot-beam can span across multiple countries and jurisdictions. Many countries require that a call originated from that country be interceptible in that country. Legal interception points are typically in the core network domain.

To achieve this, the system 100 can utilize the SBSS 107 to determine the position of the UT 111 (step 2401). That is, the SBSS 107 can track where the packets are routed based on UT position, per step 2403. According to one embodiment, the SBSS 107 receives or estimates the UT position at the time of session origination; and this position information is updated in-session upon UT movement. Depending on UT position, the SBSS 107 has a routing functionality to multiple core network elements. This is illustrated in FIG. 25 below.

Figure 25:
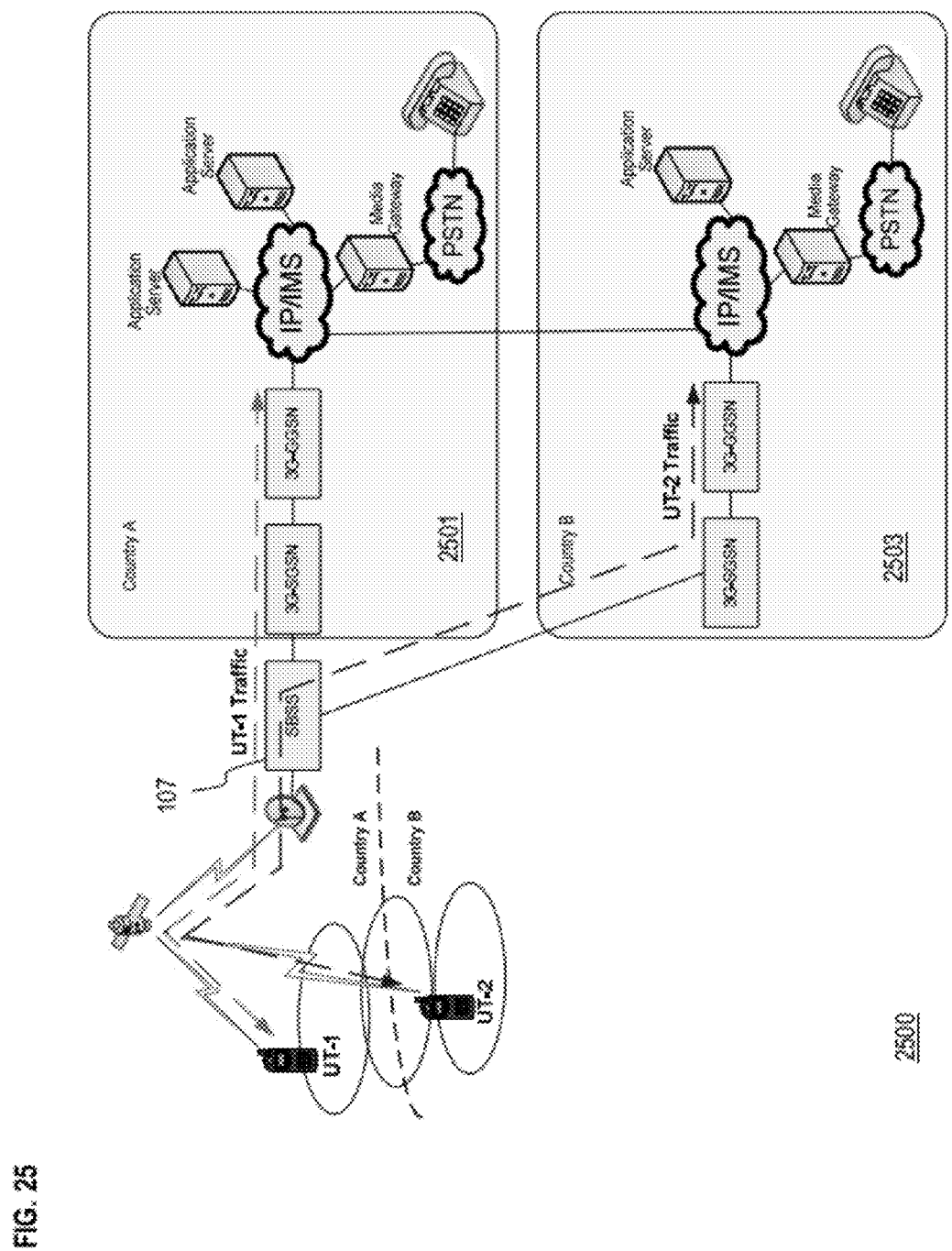
FIG. 25 is a diagram of a communication system capable of providing legal interception handling, according to an exemplary embodiment.

FIG. 25 is a diagram of a communication system capable of providing legal interception handling, according to an exemplary embodiment. Under the architecture 2500, the SBSS 107 interfaces with two different terrestrial systems 2501 and 2503. The SBSS routing functionality can facilitate legal interception in core network based on the position of the UT. For instance, UT-1 is determined to be in the jurisdiction of country A, and thus, the SBSS 107 forwards traffic, denoted UT-1 traffic, to the terrestrial system 2501 of country A. Also, upon determining that the UT-2 is within the borders of country B, the SBSS 107 routes UT-2 traffic to the terrestrial system 2503 of country B.

One of ordinary skill in the art would recognize that the processes for providing a satellite interface to support mobile communication services may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below.

Figure 26:
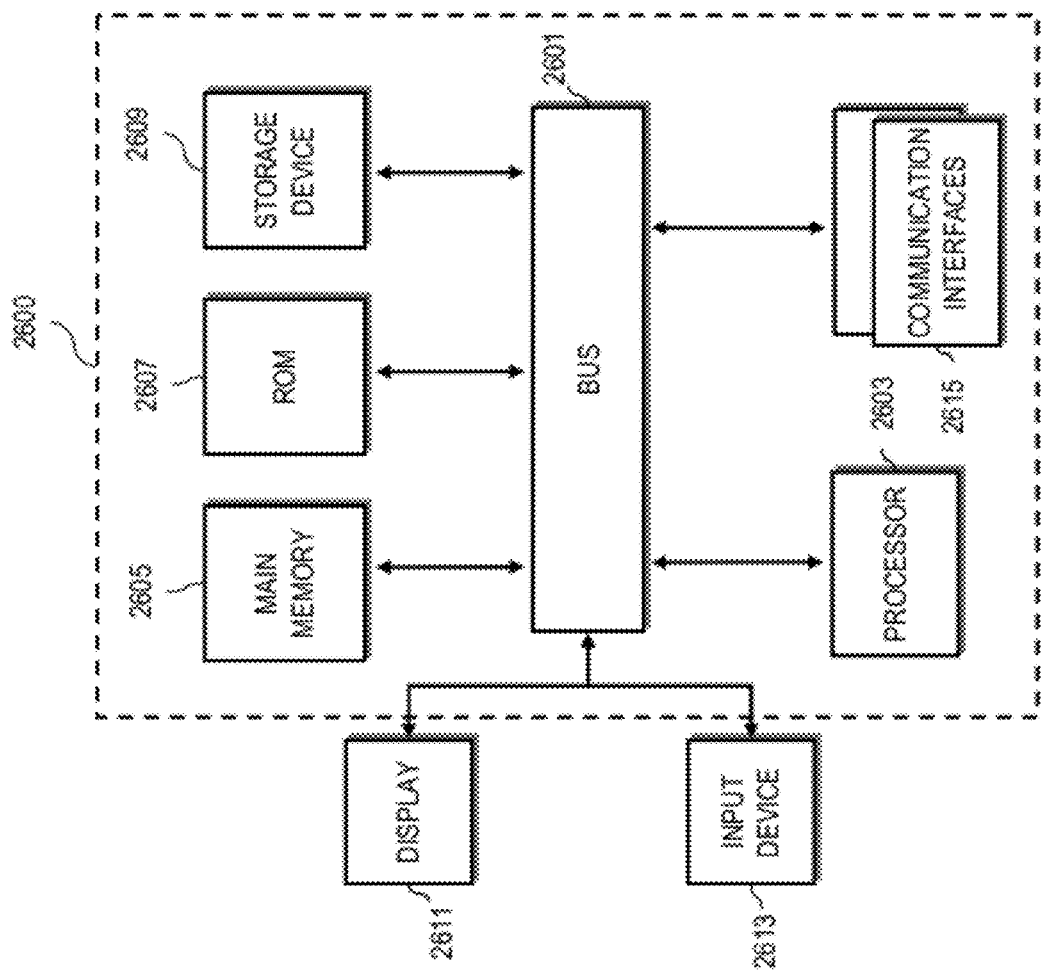
FIG. 26 is a diagram of hardware that can be used to implement certain embodiments.

FIG. 26 illustrates exemplary hardware that can be used to implement certain embodiments. A computing system 2600 includes a bus 2601 or other communication mechanism for communicating information and a processor 2603 coupled to the bus 2601 for processing information. The computing system 2600 also includes main memory 2605, such as a random access memory (RAM) or other dynamic storage device, coupled to the bus 2601 for storing information and instructions to be executed by the processor 2603. Main memory 2605 can also be used for storing temporary variables or other intermediate information during execution of instructions by the processor 2603. The computing system 2600 may further include a read only memory (ROM) 2607 or other static storage device coupled to the bus 2601 for storing static information and instructions for the processor 2603. A storage device 2609, such as a magnetic disk or optical disk, is coupled to the bus 2601 for persistently storing information and instructions.

The computing system 2600 may be coupled via the bus 2601 to a display 2611, such as a liquid crystal display, or active matrix display, for displaying information to a user. An input device 2613, such as a keyboard including alphanumeric and other keys, may be coupled to the bus 2601 for communicating information and command selections to the processor 2603. The input device 2613 can include a cursor control, such as a mouse, a trackball, or cursor direction keys, for communicating direction information and command selections to the processor 2603 and for controlling cursor movement on the display 2611.

According to various embodiments of the invention, the processes described herein can be provided by the computing system 2600 in response to the processor 2603 executing an arrangement of instructions contained in main memory 2605. Such instructions can be read into main memory 2605 from another computer-readable medium, such as the storage device 2609. Execution of the arrangement of instructions contained in main memory 2605 causes the processor 2603 to perform the process steps described herein. One or more processors in a multi-processing arrangement may also be employed to execute the instructions contained in main memory 2605. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 2600 also includes at least one communication interface 2615 coupled to bus 2601. The communication interface 2615 provides a two-way data communication coupling to a network link (not shown). The communication interface 2615 sends and receives electrical, electromagnetic, or optical signals that carry digital data streams representing various types of information. Further, the communication interface 2615 can include peripheral interface devices, such as a Universal Serial Bus (USB) interface, a PCMCIA (Personal Computer Memory Card International Association) interface, etc.

The processor 2603 may execute the transmitted code while being received and/or store the code in the storage device 2609, or other non-volatile storage for later execution. In this manner, the computing system 2600 may obtain application code in the form of a carrier wave.

The term "computer-readable medium" as used herein refers to any medium that participates in providing instructions to the processor 2603 for execution. Such a medium may take many forms, including but not limited to non-volatile media, volatile media, and transmission media. Non-volatile media include, for example, optical or magnetic disks, such as the storage device 2609. Volatile media include dynamic memory, such as main memory 2605. Transmission media include coaxial cables, copper wire and fiber optics, including the wires that comprise the bus 2601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 27:
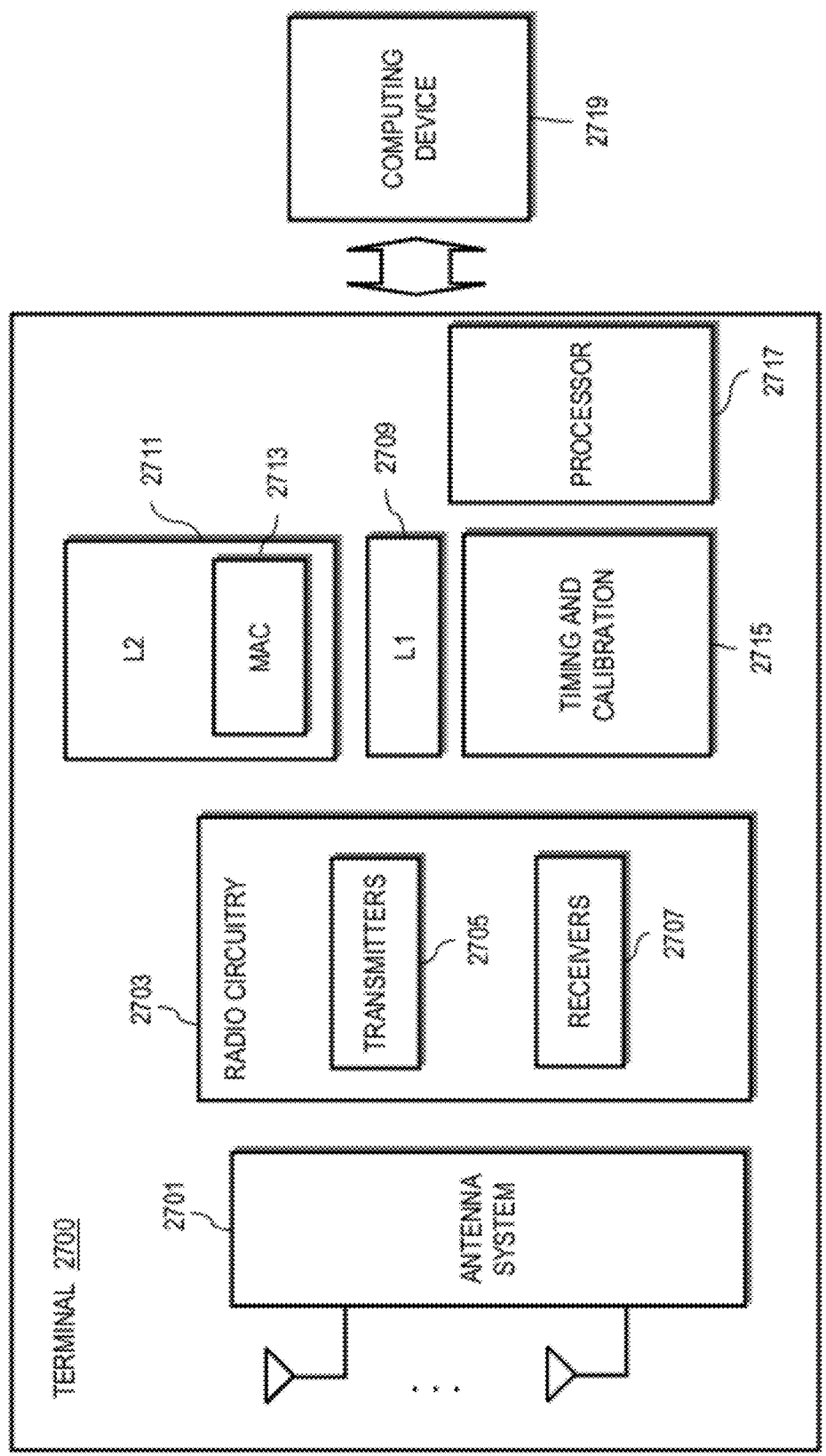
FIG. 27 is a diagram of exemplary components of a user terminal configured to operate in the systems of FIGS. 1A and 1B, according to an exemplary embodiment.

FIG. 27 is a diagram of exemplary components of a user terminal configured to operate in the systems of FIGS. 1A and 1B, according to an exemplary embodiment. A user terminal 2700 includes an antenna system 2701 (which can utilize multiple antennas) to receive and transmit signals. The antenna system 2701 is coupled to radio circuitry 2703, which includes multiple transmitters 2705 and receivers 2707. The radio circuitry encompasses all of the Radio Frequency (RF) circuitry as well as base-band processing circuitry. As shown, layer-1 (L1) and layer-2 (L2) processing are provided by units 2709 and 2711, respectively. Optionally, layer-3 functions can be provided (not shown). Module 2713 executes all Medium Access Control (MAC) layer functions. A timing and calibration module 2715 maintains proper timing by interfacing, for example, an external timing reference (not shown). Additionally, a processor 2717 is included. Under this scenario, the user terminal 2700 communicates with a computing device 2719, which can be a personal computer, work station, a Personal Digital Assistant (PDA), web appliance, cellular phone, etc.

Link Adaptation 1.0 Overview

The link adaptation includes modulation-code rate adaptation and power control on the forward and return links. This chapter describes the algorithms used for these two purposes.

A link adaptation loop has two endpoints: the gateway (S-BSS) and the user terminal (UT). On the forward link, the UTs measure and report their signal quality to the S-BSS. The S-BSS uses this feedback to adjust its modulation-code rate, power, or both for each UT. On the return link, the S-BSS monitors the signal quality from each UT, combining it with the feedback from each UT to adjust their modulation-code rate, power, or both.

2.0 Radio Link Measurement

The S-BSS and the UT continuously measure the signal quality of their received bursts to monitor and respond to variations in their channels. These quality metrics are referred to as the Signal Quality Measure (SQM) that equals the estimated signal-to-noise-interference ratio and the Link Quality Indicator (LQI—on the forward link the metric is called the Forward Quality Indicator or FQI; on the return link the metric is called the Return Quality Indicator or RQI) that indicates the FER.

3.0 Link Adaptation and Power Control Parameters 3.1 Dedicated Channel

In the case of a return link dedicated channel, the UT will transmit three values to the S-BSS: the SQIR or the mean SQM, the FQI of the forward quality indicator that represents the Boolean CRC indicator for the burst received at the UT, and the PAN, which is the relative power at which the UT transmitted. The 1 bit FQI indicator is sent to the S-BSS every burst. The SQIR and PAN are each encoded into 6 bit words. These 12 bits (SQIR followed by PAN) are Golay encoded to yield a 24 bit field. This field is segmented into six groups of 4 bits. Each DCH (PNB3(1,n), where n=3 or 6) or KAB3 burst carriers these 4 bits. Since each burst is 40 ms apart, the 24 bit message is conveyed over 240 ms; this 240 ms period is called the link adaptation control unit for a dedicated channel.

In the case of a forward link dedicated channel, the S-BSS transmits three values to the UT: the SQIR or the mean of its SQM, the RQI of the return quality indicator that represents the Boolean CRC indicator for each burst received at the S-BSS, and the PAR—the relative power at which the UT must transmit. The UT will only use PAR and ignore received SQIR and RQI in the current design. The 1 bit RQI indicator is sent to the UT every DCH burst. The SQIR and PAR are each encoded into a 6 bit words. These 12 bits (SQIR followed by PAR) are Golay encoded to yield a 24 bit field. This field is segmented into six groups of 4 bits. Each DCH (PNB3

(1,n), where n=3 or 6) or KAB3 burst carriers these 4 bits. Since each burst is 40 ms apart, the 24 bit message is conveyed over 240 ms; this 240 ms period is called the link adaptation control unit for a dedicated channel.

3.2 Shared Packet Data Channel

In the case of a return link shared packet data channel, the UT sends the 6 bit PAN within the PUI of every burst. The UTs send the mean and the standard deviation of the SQM via the PACCH message. The UT also uses the PAACH message to send the 6 bit FQI, which for a shared packed data channel represents the measured FER over some time duration.

In the case of a forward link shared packet data channel, the S-BSS sends the 6 bit PAR value to the UT on a single burst.

4.0 Rate Adaptation 4.1 Forward Link 4.1.1 Dedicated Traffic Channel

The UT will measure and report SQM and FQI to S-BSS. The method of processing and filtering the reported SQIR and FQI is described in Section 5.1.

The S-BSS shall compute the metric $$d = LQM_{avg}(n) - SQT - \eta_{dn}$$

where $LQM_{avg}(n)$ is the current LQM value, SQT (equals 7.05+δ1 dB for the PNB3(1,3) burst and 2.15+δ2 dB for the PNB3(1,6) burst—the default value for δ1 and δ2 is 0 dB) is the target Es/No for the 4 kbps rate regardless of the actual (2.45 kbps or 4 kbps) rate being used and $\eta_n$, the forward link margin, is calculated as $$\eta_{dn} = c_{dn} \cdot LQM_{std}(n) + \lambda_n$$

where $c_{dn}$ is $$c_{dn} = \begin{cases} c_{dn,low} & LQM_{avg}(n) < LQM_{avg}(n-1) \\ c_{dn,high} & \text{Otherwise} \end{cases}$$

and $LQM_{avg}(n-1)$ is the previous LQM value. The default, but configurable values of $c_{dn,low}$ is 0.5 and $c_{dn,high}$ is 0.8. If $LQM_{avg}(n-1)$ is not available in the initial case, then $c_{dn}$ equals $c_{dn,low}$. The algorithm shall select the 4 kbps rate if the metric d is greater than or equal to some threshold TH, otherwise the algorithm shall select the 2.45 kbps rate.

4.1.2 Shared Packet Data Channel

A UT using a shared packet data channel in the forward and return links will measure its FER and compute the average and the standard deviation of its SQM over all the N bursts (including the PKAB) received during a designated time window $T_{sqir}$ (4 seconds) as $$SQM_{avg} = \frac{1}{N} \sum_{j=1}^{N} SQM_j$$

$$SQM_{avg}^2 = \frac{1}{N-1} \sum_{j=1}^{N} (SQM_j)^2$$

$$SQM_{std} = \sqrt{SQM_{avg}^2 - (SQM_{avg})^2}$$

The UT will report the quantized mean FER (FQI) and the quantized mean (SQIR) and the standard deviation (SQISDR) of the SQM to the S-BSS in one of two ways:

Periodic report: UT sends FQI, SQIR, and the SQISDR at periodic $T_{sqir}$ intervals A UT using a shared packet data channel in the forward and a dedicated channel in return link will compute its average SQM over all the N bursts received over 240 ms as $$SQM_{avg} = \frac{1}{N} \sum_{j=1}^{N} SQM_j$$

The UT will report the quantized mean (SQIR) of the SQM to the S-BSS once every 240 ms. This UT will also send a 1 bit FQI to the S-BSS every burst.

Filtering of SQIR and SQISDR at S-BSS

If the S-BSS receives the feedback from the UT over a shared packet data channel, it shall filter the SQIR and SQISDR to obtain its average $SQIR_{avg}$ and standard deviation $SQISDR_{avg}$ as $$SQIR_{avg,n} = \gamma \cdot SQIR + (1-\gamma) \cdot SQIR_{avg,n-1}$$

$$SQISDR_{avg,n} = \gamma \cdot SQISDR + (1-\gamma) \cdot SQISDR_{avg,n-1}$$

If it receives the feedback from the UT over a dedicated channel, it shall use it to compute $SQIR_{avg}$ and $SQISDR_{avg}$ as $$SQIR_{avg,n} = \gamma \cdot SQIR + (1-\gamma) \cdot SQIR_{avg,n-1}$$

$$SQIR_{var,n} = \gamma \cdot (SQIR - SQIR_{avg,n})^2 + (1-\gamma) \cdot SQIR_{var,n-1}$$

$$SQISDR_{avg,n} = \sqrt{SQIR_{var,n}}$$

The forgetting factor γ is configurable and the default value is set to 0.1.

Filtering of FQI at S-BSS

If the S-BSS receives the 1 bit FQI from the UT over a dedicated channel, it shall use it to compute the margin λ as $$\lambda_n = \begin{cases} \lambda_{n-1} - \Delta \cdot \left( \frac{FER_{target}}{1 - FER_{target}} \right) & FQI = 1 (CRC \text{ passed}) \\ \lambda_{n-1} + \Delta & FQI = 0 (CRC \text{ failed}) \end{cases}$$

where Δ and $FER_{target}$ are configurable parameters and $\lambda_0 = 0$.

If the S-BSS receives the 6 bit FQI, which represents the quantized FER measured at the UT, from the UT over the shared packet data channel, it shall use it to compute the margin λ as $$\lambda_n = \lambda_{n-1} + \Delta \cdot \left[ FQI - \left( \frac{FER_{target}}{1 - FER_{target}} \right) \cdot (1 - FQI) \right]$$

Signal Quality Target

Table 1 tabulates the different burst types and modulation-coding rate schemes used in the forward direction. The table also tabulates the target operating points (TOP) for these schemes and shows the difference between these operating points within the same burst family. The adjustment parameters δi, where i=[1, 21] are set to zero by default, but are configurable by the S-BSS.

TABLE 1

| Target Operating Points (Forward) | | | |
| --- | --- | --- | --- |
| Burst Type | Modulation | Coding Rate | Target $E_s/N_o$ (dB) |
| PNB(1, 6) | PI/4 QPSK | 0.60 | 5.55 + δ1 |
| PNB(1, 6) | PI/4 QPSK | 0.70 | 6.65 + δ2 |
| PNB(1, 6) | PI/4 QPSK | 0.80 | 7.95 + δ3 |
| PNB3(2, 6) | PI/4 QPSK | 0.60 | 4.75 + δ4 |

TABLE 1-continued

Target Operating Points (Forward)

| Burst Type | Modulation | Coding Rate | Target $E_s/N_o$ (dB) |
|---|---|---|---|
| PNB3(2, 6) | PI/4 QPSK | 0.70 | 6.15 + δ5 |
| PNB3(2, 6) | PI/4 QPSK | 0.80 | 7.55 + δ6 |
| PNB3(5, 3) | PI/4 QPSK | 0.50 | 2.95 + δ7 |
| PNB3(5, 3) | PI/4 QPSK | 0.63 | 4.45 + δ8 |
| PNB3(5, 3) | PI/4 QPSK | 0.75 | 6.35 + δ9 |
| PNB3(5, 3) | PI/4 QPSK | 0.83 | 7.40 + δ10 |
| PNB3(5, 3) | 16 APSK | 0.67 | 11.90 + δ11 |
| PNB3(5, 12) | PI/4 QPSK | 0.50 | 2.15 + δ12 |
| PNB3(5, 12) | PI/4 QPSK | 0.63 | 3.85 + δ13 |
| PNB3(5, 12) | PI/4 QPSK | 0.75 | 5.75 + δ14 |
| PNB3(5, 12) | PI/4 QPSK | 0.83 | 6.95 + δ15 |
| PNB3(5, 12) | 16 APSK | 0.67 | 11.80 + δ16 |
| PNB3(10, 3) | PI/4 QPSK | 0.61 | 4.15 + δ18 |
| PNB3(10, 3) | 16 APSK | 0.69 | 12.10 + δ21 |

Modulation-Code Rate Adaptation

Each new TBF will get a modulation-code rate update opportunity, i.e., whenever a new TBF is established, a modulation-code rate will be selected as a part of TBF establishment procedure as follows. If Tgap≤Tg,f, the network shall use the $SQM_{avg}(n)$, $SQM_g(n-1)$, and $SQM_{dev}(n-1)$ averages as described below to select the appropriate modulation-coding rate—Tgap is the time interval between the beginning of the current TBF and the end of the previous TBF, while the threshold Tg,f has a default value of 8 seconds. However, if Tgap>Tg,f or if the signal and link quality measurements are not available, then the network shall select the most robust modulation-code rate (the rate with the lowest target Es/No) for Best Effort traffic and the modulation-code rate dictated by RRC/RLM for Guaranteed Service traffic.

Once the TBF has been established, the modulation-code rate selection for forward link is performed at the network based on the history of the channel performance. If the history of the forward link quality $SQIR_{avg}$ is available, then the following metric is calculated:

$$d_i = SQIR_{avg}(n) - (E_s/N_0)_i - \eta_{dn}$$

where $SQIR_{avg}(n)$ is the current $SQIR_{avg}$ value, $(E_s/N_0)_i$ denotes the TOP, i indicates the modulation-coding rate scheme within each burst family, and $\eta_{dn}$, the forward link margin, is calculated as $$\eta_{dn} = c_{dn} \cdot SQISDR_{avg}(n) + \lambda_n$$

where $c_{dn}$ is $$c_{dn} = \begin{cases} c_{dn,low} & SQIR_{avg}(n) < SQIR_{avg}(n-1) \\ c_{dn,high} & \text{Otherwise} \end{cases}$$

and $SQIR_{avg}(n-1)$ is the previous SQIR value. The default, but configurable values of $c_{dn,low}$ is 0.5 and $c_{dn,high}$ is 0.8. If $SQIR_{avg}(n-1)$ is not available, then $c_{dn}$ equals $c_{dn,low}$.

The k-th modulation-code rate shall be selected such that $d_k$ is the minimal positive number among all $d_i$. If $d_i$ is negative for all of the modulation-coding schemes, then the lowest (most robust) modulation-code rate is selected.

4.2 Return Link

The return link adaptation is based on the SQM of the return link traffic and the transmission power level of the return link. Once the radio resources have been allocated (i.e., the TBF is active), the SQM averaging at the network shall be done separately for each burst type received from the UT (because the measured SQMs will be different for the different burst types). Similarly, the RQI processing shall be done separately for each burst type and code rate (because the FER performance will be different across burst types and code rates).

The S-BSS shall compute the LQM statistics and use the RQI to compute the margin using the method as described in Section 5.2.

4.2.1 Dedicated Traffic Channel

The S-BSS shall compute the metric $$d = LQM_{avg}(n) - SQT - \eta_{dn}$$

where $LQM_{avg}(n)$ is the current LQM value, SQT (equals 7.05+δ1 dB for the PNB3(1,3) burst and 2.15+δ2 dB for the PNB3(1,6) burst—the default value for δ1 and δ2 is 0 dB) is the target Es/No for the 4 kbps rate regardless of the actual (2.45 kbps or 4 kbps) rate being used and $\eta_{dn}$, the forward link margin, is calculated as $$\eta_{dn} = c_{dn} \cdot LQM_{std}(n) + \lambda_n$$

where $c_{dn}$ is $$c_{dn} = \begin{cases} c_{dn,low} & LQM_{avg}(n) < LQM_{avg}(n-1) \\ c_{dn,high} & \text{Otherwise} \end{cases}$$

and $LQM_{avg}(n-1)$ is the previous LQM value. The default, but configurable values of $c_{dn,low}$ is 0.5 and $c_{dn,high}$ is 0.8. If $LQM_{avg}(n-1)$ is not available, then $c_{dn}$ equals $c_{dn,low}$. The algorithm shall select the 4 kbps rate if the metric d is greater than or equal to some configurable threshold TH, otherwise the algorithm shall select the 2.45 kbps rate.

4.2.2 Shared Packet Data Channel

Power Attenuation Notification (PAN), SQM, and RQI

The return link modulation-code rate adaptation is based on the SQM of the return link traffic and the transmission power level of the return link, which is represented by PAN. The PAN is defined as the attenuation of return link transmit power with respect to UT's maximum transmit power level, i.e.:

$$PAN = P\text{max} - \text{Power level of the burst}$$

Upon receiving a burst, the network measures the signal quality, $SQM_j$, of the burst. In order to eliminate the effect of the short-term channel variation, the network filters the SQM. For the return link modulation-code rate adaptation purpose, the network maintains three averaging filters as follows:

$$SQM_{avg} = \beta SQM_j + (1-\beta) SQM_{avg}$$

$$PAN_{avg} = \beta PAN_j + (1-\beta) PAN_{avg}$$

$$SQM_{var} = \beta (SQM_j - SQM_{avg})^2 + (1-\beta) SQM_{var}$$

These filters are created when the network receives a successful RACH message from a given UT. The network maintains these filter operation for the duration of the PDP context. These three filters are synchronized, i.e. they are established and torn down at the same time. The forgetting factor β is configurable and the default value is set to 0.1. The SBSS will maintain filters for each PDP context.

The signal quality measurements for the PRACH or for the RACH may not be reliable due to the transmit power uncertainty. Therefore, these measurements shall not be used in the above filter operations.

In addition to these three filters, the network uses the Boolean CRC pass or fail indicator from each received burst to compute the margin λ as $$\lambda_n = \begin{cases} \lambda_{n-1} - \Delta \cdot \left( \dfrac{FER_{target}}{1 - FER_{target}} \right) & RQI = 1(CRC \text{ passed}) \\ \lambda_{n-1} + \Delta & RQI = 0(CRC \text{ failed}) \end{cases}$$

where $\Delta$ and $FER_{target}$ are configurable parameters. Note that the network shall maintain separate margins $\lambda$'s for the different burst types and code rates.

Diversity Combining

With diversity combining, the SQM and the RQI used for the above computations are the SQM and the RQI of the selected path. The selected path is defined as the one for which the CRC passed and as the one that has the highest SQM.

Signal Quality Target

Table 2 tabulates the different burst types and modulation-coding rate schemes used in the return direction. The table also tabulates the target operating points (TOP) for these schemes and shows the difference between these operating points within the same burst family. The adjustment parameters $\delta i$, where $i=[1, 13]$ are set to zero by default, but are configurable by the S-BSS.

TABLE 2

Target Operating Points (Return)

| Burst Type | Modulation | Coding Rate | Target $E_s/N_o$ (dB) |
|---|---|---|---|
| PNB(1, 6) | PI/4 QPSK | 0.60 | 5.55 + δ1 |
| PNB(1, 6) | PI/4 QPSK | 0.70 | 6.65 + δ2 |
| PNB(1, 6) | PI/4 QPSK | 0.80 | 7.95 + δ3 |
| PNB3(2, 6) | PI/4 QPSK | 0.60 | 4.75 + δ4 |
| PNB3(2, 6) | PI/4 QPSK | 0.70 | 6.15 + δ5 |
| PNB3(2, 6) | PI/4 QPSK | 0.80 | 7.55 + δ6 |
| PNB3(5, 3) | PI/4 QPSK | 0.50 | 2.95 + δ7 |
| PNB3(5, 3) | PI/4 QPSK | 0.63 | 4.45 + δ8 |
| PNB3(5, 3) | PI/4 QPSK | 0.75 | 6.35 + δ9 |
| PNB3(5, 3) | PI/4 QPSK | 0.83 | 7.40 + δ10 |
| PNB3(5, 12) | PI/4 QPSK | 0.50 | 2.15 + δ11 |
| PNB3(5, 12) | PI/4 QPSK | 0.63 | 3.85 + δ12 |
| PNB3(5, 12) | PI/4 QPSK | 0.75 | 5.75 + δ12 |
| PNB3(5, 12) | PI/4 QPSK | 0.83 | 6.95 + δ13 |

Modulation-Code Rate Adaptation

At the establishment of a TBF, the network shall select the modulation-code rate as follows. If Tgap≤Tg,f, the network shall use the $SQM_{avg}(n)$, $SQM_{avg}(n-1)$, and $SQM_{dev}(n-1)$ averages as described below to select the appropriate modulation-coding rate—Tgap is the time interval between the beginning of the current TBF and the end of the previous TBF, while the threshold Tg,f has a default value of 16 seconds. However, if Tgap>Tg,f or if the signal and link quality measurements are not available, then the network shall select the most robust modulation-code rate (the rate with the lowest target Es/No) for Best Effort traffic and the modulation-code rate dictated by RRC/RLM for Guaranteed Service traffic.

Once the TBF has been established, the network determines the return link modulation-code rate based upon the history of the signal quality measurements taken during previous return link TBFs. If the history of $SQM_{avg}$ and $PAN_{avg}$ is available, then the following metric is calculated:

$$d_i = SQM_{avg}(n) + PAN_{avg} - (E_s/N_0)_i - \eta_{up}$$

where $SQIR_{avg}(n)$ is the current SQIR value, $(E_s/N_0)_i$ denotes the TOP, i indicates the modulation-coding rate scheme within each burst family and $\eta_{up}$, the return link margin, is calculated as $$\eta_{up} = c_{up} \cdot SQM_{dev}(n) + \lambda_{n,i}$$

where $SQM_{dev}$ is the standard deviation of the SQM estimate and could be derived from $SQM_{var}$, $\lambda n,i$ is the current margin for the i-th code rate, and $c_{up}$ is $$c_{up} = \begin{cases} c_{up,low} & SQIR_{avg}(n) < SQIR_{avg}(n-1) \\ c_{up,high} & \text{Otherwise} \end{cases}$$

and $SQIR_{avg}(n-1)$ is the previous SQIR value. The default, but configurable values of $c_{up,low}$ is 0.5 and $c_{up,high}$ is 0.8. If $SQIR_{avg}(n-1)$ is not available, then $c_{up}$ equals $c_{up,low}$.

The k-th modulation-code rate shall be selected such that $d_k$ is the minimal positive number among all $d_i$. If no modulation-code rate that satisfies positive $d_i$ is found, then the lowest (most robust) modulation-code rate is selected.

Power Control 5.1 Forward Link

Adaptive power control is used for dedicated channel. Predetermined power level is used for shared packet data channel.

For forward link, power control for DCH is based on the forward link signal quality and the S-BSS PAN. UT monitors its received signal and estimates its SQM and FQI per burst. The S-BSS varies the power attenuation request based on these measurements and its PAN value.

5.1.1 Dedicated Channel

A UT using a dedicated channel will receive a burst from the S-BSS every 40 ms. The UT will compute its mean SQM over six such bursts (including a KAB3) as $$SQM_{avg} = \frac{1}{6} \sum_{j=1}^{6} SQM_j$$

The UT will report the quantized mean SQM to the S-BSS once every 240 ms.

For every burst received from the S-BSS, the UT will also determine the corresponding 1 bit FQI by examining the CRC pass or fail indicator. It will report this FQI to the S-BSS every burst. However, if the UT receives a KAB3 during the silence period in the forward link, then it shall report the FQI that corresponded to the previous or last DCH.

Filtering of SQIR at S-BSS

The S-BSS combines its PAN value with the $SQM_{avg}$ it receives from the UT to compute a link quality measure (LQM), i.e., $$LQM = SQIR_{avg} + PAN$$

The S-BSS must combine the correct PAN value with the $SQM_{avg}$ to ensure that two are related. It can do so by storing its PAN values in a buffer whose depth matches the typical delay associated with receiving feedback from the UT. The S-BSS will read this buffer in a FIFO manner.

The S-BSS computes the mean and the standard deviation of the LQM as $$LQM_{avg,n} = \gamma \cdot LQM + (1-\gamma) \cdot LQM_{avg,n-1}$$

$$LQM_{var,n} = \gamma (LQM - LQM_{mean,n})^2 + (1-\gamma) \cdot LQM_{var,n-1}$$

$$LQM_{std,n} = \sqrt{LQM_{var,n}}$$

where n=2, 3, ... is the index of the received burst from the UT since the establishment of a TBF. The forgetting factor $\gamma$ is $$\gamma = \begin{cases} \frac{1}{2^{n-1}} & 1 < n < N_2 \\ \frac{1}{2^{N_2}} & n > N_2 \end{cases}$$

where $N_2=3$ is a preconfigured value.

Filtering of FQI at S-BSS

Upon receiving the FQI from the UT, the S-BSS will compute the margin $\lambda$ as $$\lambda_n = \begin{cases} \lambda_{n-1} - \Delta \cdot \left(\frac{FER_{target}}{1-FER_{target}}\right) & FQI = 1 (CRC \text{ passed}) \\ \lambda_{n-1} + \Delta & FQI = 0 (CRC \text{ failed}) \end{cases}$$

Where $\Delta$ and $FER_{target}$ are configurable ($\Delta=1$ dB and $FER_{target}=1E-2$, corresponds to the target Es/No or SQT).

However, if the FQI received by the S-BSS corresponded to a KAB3 transmission in the forward direction, then the S-BSS shall ignore that FQI and not update the margin $\lambda$. Likewise, if the FQI received by the S-BSS corresponded to a shared packet data in the forward direction, then the S-BSS shall ignore that FQI and not update the margin $\lambda$.

Power Control for Dedicated Channel

At the end of each $T_{power}$ period, the S-BSS adjusts its PAN as $$PAN = LQM_{mean} - c \cdot LQM_{std} - SQT - \lambda_n$$

where c is a constant (1 or 2) and SQT is the target Es/No. For dedicated associated control channels, the SQT (equals $7.05+\delta 1$ dB for the PNB3(1,3) burst and $2.15+\delta 2$ dB for the PNB3(1,6) burst—the default value for $\delta 1$ and $\delta 2$ is 0 dB) is the target Es/No for the 4 kbps vocoder rate regardless of the actual (2.45 kbps or 4 kbps) vocoder rate being used.

5.2 Return Link

During initialization, the burst shall be transmitted at maximum power according to [6]. Once the initialization of a traffic channel on return link has been completed, continuous power control shall begin. The transmit power at the UT is regulated so as to achieve expected, but not excessive, signal quality at the network end. This is based upon signal quality measurements made at the network receiver. At the network, the received signal quality is compared with a signal quality target value (SQT), and the network will determine a new desired power (PAR), and issue a command message to the UT to adjust its power. Once the radio resources have been allocated (i.e., the TBF is active), the SQM or signal quality averaging at the network shall be done separately for each burst type received from the UT (because the measured SQMs will be different for the different burst types). Similarly, the RQI processing shall be done separately for each burst type and code rate (because the FER performance will be different across burst types and code rates).

For dedicated channels in the return link, the network shall convey the PAR value during the silence period in the forward direction when either of the following is true.

1. If the new "quantized" PAR is different from the previous "quantized" PAR then the network shall transmit a PDCH burst containing only the PAR value 2. When the network transmits the comfort noise over a PDCH burst, it shall also transmit the PAR value over that same burst For shared packet data channels in the return link if there is no active forward link TBF, a PACCH message could be created to convey the PAR value when the following two conditions are both met:

Forward link burst is not available within three frames duration (120 msec) after the network calculates a new PAR value.

The difference between new PAR value and the previous transmitted PAR value is greater than or equal to two step sizes of the PAR quantization, which is 0.8 dB.

Diversity Combining

With diversity combining, the SQM and the RQI are the SQM and the RQI of the selected path. The selected path is defined as the one for which the CRC passed and as the one that has the highest SQM.

5.2.1 Dedicated Channel

The S-BSS will receive a burst from a UT every 40 ms. It shall measure the SQM of the burst, combining it with the PAN feedback from the UT to compute the LQM. The S-BSS shall compute the mean and the standard deviation of the LQM as $$LQM_{avg,n} = \gamma \cdot LQM + (1-\gamma) \cdot LQM_{avg,n-1}$$

$$LQM_{var,n} = \gamma \cdot (LQM - LQM_{mean,n})^2 + (1-\gamma) \cdot LQM_{var,n-1}$$

$$LQM_{std} = \sqrt{LQM_{var,n}}$$

where n=2, 3, ... is the index of the received burst from the UT since the establishment of a TBF. The forgetting factor $\beta$ is $$\gamma = \begin{cases} \frac{1}{2^{n-1}} & 1 < n < N_2 \\ \frac{1}{2^{N_2}} & n > N_2 \end{cases}$$

where $N_2=3$ is a preconfigured value. In computing these statistics, the S-BSS will use the previous PAN value if a new value has not been received from the UT.

Upon receiving a burst from the UT, the S-BSS will use the 1 bit RQI to compute the margin $\lambda$ as $$\lambda_n = \begin{cases} \lambda_{n-1} - \Delta \cdot \left(\frac{FER_{target}}{1-FER_{target}}\right) & RQI = 1 (CRC \text{ passed}) \\ \lambda_{n-1} + \Delta & RQI = 0 (CRC \text{ failed}) \end{cases}$$

where $\Delta=1$ dB and $FER_{target}=1E-2$. Note that the network shall maintain separate margins $\lambda$'s for the different burst types and code rates.

Power Control for Dedicated Channel

At the end of each $T_{power}$ period, the S-BSS adjusts the UT's PAR as $$PAR = LQM_{mean} - c \cdot LQM_{std} - SQT - \lambda_n$$

where c is a constant (1 or 2), SQT is the target Es/No, and $\lambda_n$ is the current margin for the desired code-rate. For dedicated associated control channels, the SQT (equals $7.05+\delta 1$ dB for the PNB3(1,3) burst and $2.15+\delta 2$ dB for the PNB3(1,6) burst—the default value for $\delta 1$ and $\delta 2$ is 0 dB) is the target Es/No for the 4 kbps vocoder rate regardless of the actual (2.45 kbps or 4 kbps) vocoder rate being used. After computing the PAR, the S-BSS shall compute the normalized PAR relative to a 31.25 kHz channel as $$PAR_{norm} = PAR + 10 \cdot \log_{10}\left(\frac{B}{31.25}\right)$$

where B is the carrier bandwidth, measured in kHz, in the return link (the UT shall subtract the bandwidth adjustment factor from its normalized PAR to compute its PAN value).

Figure 28:
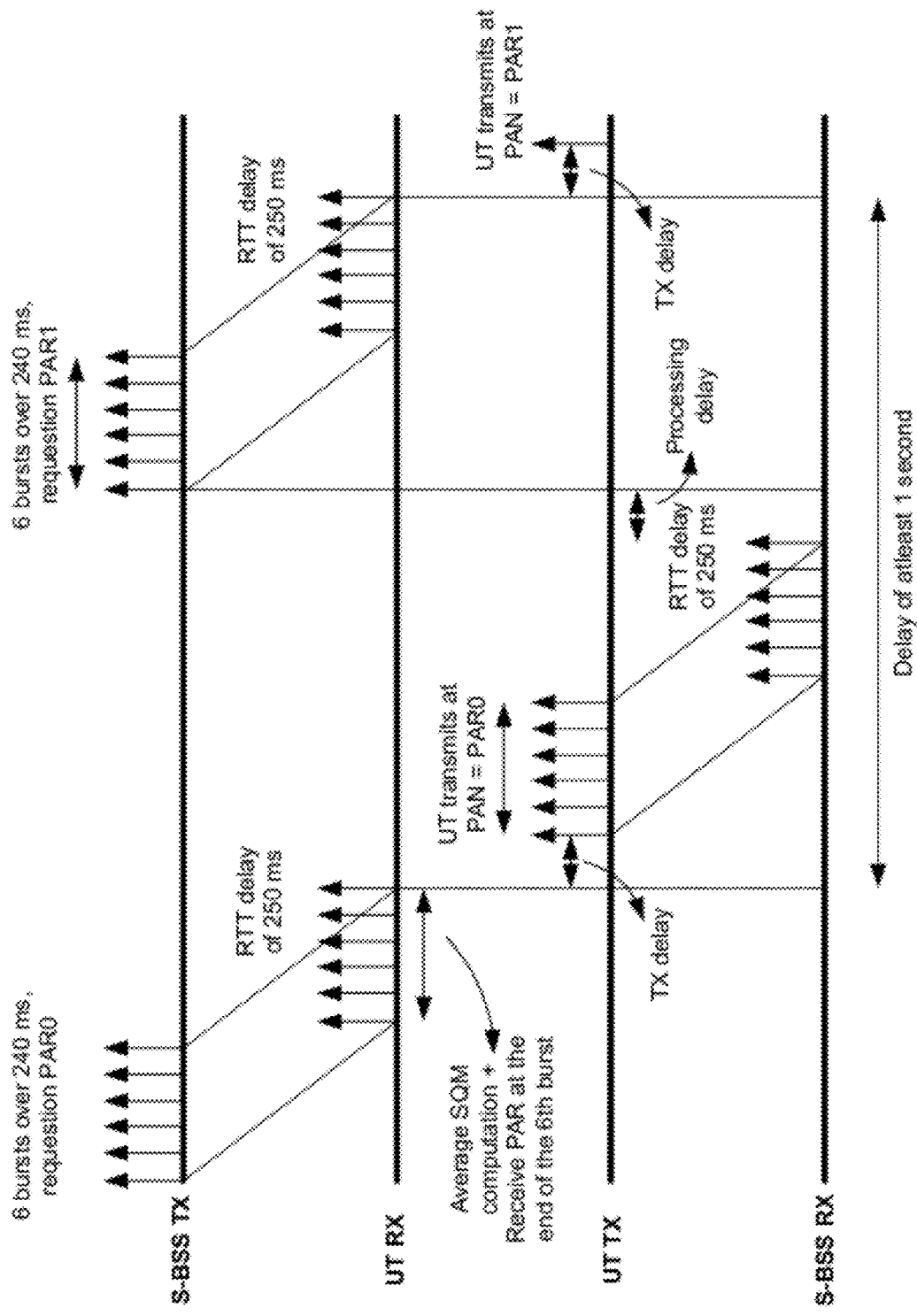
FIG. 28 is a diagram of a timing flow of the return link power control, according to certain embodiments.

A timing flow of the return link power control is shown FIG. 28.

5.2.2 Shared Packet Data Channel

Upon receiving a burst from the UT, the S-BSS shall measure its SQM, combining it with the PAN feedback from the UT to compute the LQM. The S-BSS shall compute the mean and the standard deviation of the LQM as $$LQM_{avg,n} = \gamma \cdot LQM + (1-\gamma) \cdot LQM_{avg,n-1}$$

$$LQM_{var,n} = \gamma \cdot (LQM - LQM_{mean,n})^2 + (1-\gamma) \cdot LQM_{var,n-1}$$

$$LQM_{std,n} = \sqrt{LQM_{var,n}}$$

where n=2, 3, . . . is the index of the received burst from the UT since the establishment of a TBF. The forgetting factor $\gamma$ is $$\gamma = \begin{cases} \frac{1}{2^{n-1}} & 1 < n < N_2 \\ \frac{1}{2^{N_2}} & n > N_2 \end{cases}$$

where $N_2$=3 is a preconfigured value. In computing these statistics, the S-BSS will use the previous PAN value if a new value has not been received from the UT.

Upon receiving a burst from the UT, the S-BSS will use the 1 bit RQI to compute the margin $\lambda$ as $$\lambda_n = \begin{cases} \lambda_{n-1} - \Delta \cdot \left(\frac{FER_{target}}{1 - FER_{target}}\right) & RQI = 1(CRC \text{ passed}) \\ \lambda_{n-1} + \Delta & RQI = 0(CRC \text{ failed}) \end{cases}$$

where $\Delta$=1 dB and $FER_{target}$=1E-3.

Power Control for Shared Packet Channel

At the end of each $T_{power}$ period, the S-BSS adjusts the UT's PAR as $$PAR = LQM_{mean} - c \cdot LQM_{std} - SQT - \lambda_n$$

where c is a constant (1 or 2) and SQT is the target Es/No for the modulation-coding rate scheme being used in the return direction. After computing the PAR, the S-BSS shall compute the normalized PAR relative to a 31.25 kHz channel as $$PAR_{norm} = PAR + 10 \cdot \log_{10}\left(\frac{B}{31.25}\right)$$

where B is the carrier bandwidth, measured in kHz, in the return link (the UT shall subtract the bandwidth adjustment factor from its normalized PAR to compute its PAN value).

If the UT is transmitting a mixture of Best Effort and Guaranteed Service traffic, then the S-BSS will compute the normalized PAR for both traffic classes, transmitting the smaller normalized PAR to the UT for its next transmission. Similarly, if the UT is transmitting a mixture of bursts with different carrier bandwidths, then the S-BSS will compute the normalized PAR for all these carrier bandwidths, transmitting the smallest normalized PAR to the UT for its next transmission.

6.0 Message Error Protection

One design consideration is that a deep shadowing event and/or a deep fade are likely to cause a corruption of the received message, thus invalidating the received PAR and PAN values. Although these errors are most likely to occur for poor signal quality conditions, they can also occur for relatively good signal levels.

Gateway to UT Message Error Protection for Forward Link Power Control

In the case of the dedicated channel, the PAR is Golay and convolutional encoded. In the case of shared packet data channel, the PAR is protected by TURBO code and CRC. In the absence of a detected message error, the value of PAN is simply set to PAR in the message, and this value of PAR is saved. In the case of a detected message error, the PAN will be first set to this saved value of PAR. Then the PAN will be decrease by at least a specified amount, designated by "MEstep". In the case of consecutive message errors, this correction value MEstep will be accumulated.

UT to Gateway Message Error Protection for Return Link Power Control

In the case of the dedicated channel, the PAN is Golay and convolutional encoded. In the case of shared packet data channel, the PAN is Golay encoded. If the PAN is decoded successfully, its value will be used for PAR calculation and code rate selection. Also its value will be saved. In the case of a detected PAN message error, the previously saved PAN value will be used instead.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    transmitting, by a transmitter component of a communications device, a plurality of forward link data bursts over a channel of a wireless communications network, each being transmitted at a respective transmit power;
    storing the respective transmit powers for the forward link data bursts in a buffer;
    receiving, by a receiver component of the communications device, a plurality of return link data bursts, wherein each of one or more of the return link data bursts includes one or more signal quality metrics reflecting signal quality measurements relating to a respective one of the forward link data bursts;
    correlating the signal quality metrics for each of one or more of the forward link data bursts with the stored transmit power for the respective forward link data burst to which the signal quality metrics are related; and
    determining an updated transmit power based on the signal quality metrics and the correlated respective transmit powers, wherein the updated transmit power is calculated to achieve a target signal quality for transmission of one or more subsequent forward link data bursts over the channel.

2. The method of claim 1, further comprising:
    determining a link quality margin based on the signal quality metrics and the correlated respective transmit powers, wherein the determination of the link quality margin comprises first and second order statistics, including mean and standard deviation computations; and
    wherein the updated transmit power is determined based on the link quality margin.

3. The method of claim 1, wherein the signal quality measurements include one or more of signal to noise ratio (SNR) measurements and cyclical redundancy check (CRC) errors.

4. The method of claim 1, wherein the signal quality metrics for each of the one or more forward link data bursts further include a cyclical redundancy check (CRC) error indicator relating to the transmission of the respective forward link data bursts, the method further comprising:
    determining a CRC link quality margin based on the CRC indicators relating to one or more of the forward link data bursts all transmitted over the channel at a one of the respective transmit powers; and
    wherein the determination of the updated transmit power is further based on the CRC link quality margin.

5. The method of claim 1, wherein:
    each of one or more of the return link data bursts includes one or more signal quality metrics relating to a respective number of the forward link data bursts all transmitted over the channel at a one of the respective transmit powers; and
    the signal quality metrics of such return link data bursts reflect statistical measurements regarding a series of the signal quality measurements associated with the number of the forward link data bursts all transmitted over the channel at the one respective transmit power.

6. The method of claim 5, wherein the statistical measurements comprise one or more of a mean and standard deviation for the series of the signal quality measurements.

7. The method of claim 1, wherein a number of the return link data bursts each includes signal quality metrics reflecting signal quality measurements relating to a respective number of the forward link data bursts all transmitted over the channel at a one of the respective transmit powers, the method further comprises:
    determining a link quality margin for each of the number of return link data bursts based on the respective signal quality metrics of the return link data burst and the one respective transmit power; and
    determining a mean and standard deviation for the determined link quality margins, wherein the updated transmit power is determined based on the mean and standard deviation.

8. The method of claim 7, wherein the signal quality metrics for each of the number of forward link data bursts transmitted over the channel at a one of the respective transmit powers further include a cyclical redundancy check (CRC) error indicator relating to the transmission of the respective forward link data bursts, the method further comprising:
    determining a CRC link quality margin based on the CRC error indicators; and
    wherein the determination of the updated transmit power is further based on the CRC link quality margin.

9. The method of claim 8, wherein the signal quality metrics for one or more of the number of return link data bursts reflects a mean of a series of the signal quality measurements associated with the number of the forward link data bursts all transmitted over the channel at the one respective transmit power.

10. The method of claim 1, further comprising:
    determining that the updated transmit power exceeds a predetermined maximum transmit power; and
    determining modulation and coding schemes based on the signal quality metrics, wherein the modulation and coding schemes are determined to achieve a target signal quality for transmission of one or more subsequent forward link data bursts at the maximum transmit power over the channel.

11. The method of claim 10, wherein the determination of the modulation and coding schemes comprises, increasing a burst size for the subsequent forward link data bursts and determining the modulation and coding schemes based on the increased burst size, while maintaining a current symbol rate for the subsequent forward link data bursts.

12. A method comprising:
    transmitting, by a transmitter component of a communications device, a plurality of forward link data bursts at a predetermined transmit power to multiple communications terminals over a first shared channel of a wireless communications network;
    receiving, by a receiver component of the communications device, a plurality of return link data bursts, wherein the return link data bursts are received from the multiple communications terminals, and each of one or more of the return link data bursts received from each of the communications terminals includes one or more signal quality metrics reflecting signal quality measurements relating to a respective one of the forward link data bursts; and
    determining modulation and coding schemes based on the signal quality metrics and the predetermined transmit power, wherein the modulation and coding schemes are determined to achieve a target signal quality for transmission of one or more subsequent forward link data bursts at the predetermined transmit power to the multiple communications terminals over the first shared channel; and
    wherein the determination of the modulation and coding schemes comprises first and second order statistics, including mean and standard deviation computations.

13. The method of claim 12, wherein the signal quality measurements include one or more of signal to noise ratio (SNR) measurements and cyclical redundancy check (CRC) errors.

14. The method of claim 12, wherein the signal quality metrics for each of the one or more forward link data bursts further include a cyclical redundancy check (CRC) error indicator relating to the transmission of the respective forward link data bursts, the method further comprising:
    determining a CRC link quality margin based on the CRC indicators relating to one or more of the forward link data bursts; and
    wherein the determination of the modulation and coding schemes is further based on the CRC link quality margin.

15. The method of claim 12, wherein:
    each of one or more of the return link data bursts includes one or more signal quality metrics relating to a respective number of the forward link data bursts; and
    the signal quality metrics of such return link data bursts reflect statistical measurements regarding a series of the signal quality measurements associated with the number of the forward link data bursts.

16. The method of claim 15, wherein the statistical measurements comprise one or more of a mean and standard deviation for the series of the signal quality measurements.

17. The method of claim 12, wherein:
the return link data bursts received from at least one of the communications terminals are received over the first shared channel and the return link data bursts received from one or more other of the communications terminals are received over one or more respective dedicated channels of the wireless communications network; and
the return link data bursts received over the first shared channel are at a different periodicity compared to the return link data bursts received over the one or more respective dedicated channels.

18. The method of claim 12, wherein:
the signal quality metrics relating to the transmission of the forward link data bursts at the predetermined transmit power to a one of the communications terminals over the first shared channel reflects an inferior signal quality relative to the signal quality metrics relating to the transmission of the forward link data bursts at the predetermined transmit power to the other of the communications terminals over the first shared channel; and
the modulation and coding schemes are determined based on the signal quality metrics reflecting the inferior signal quality and the predetermined transmit power.

19. A method comprising:
receiving, by a receiver component of a communications device, a plurality of return link data bursts over each of a plurality of channels of a wireless communications network, wherein each return link data burst includes a power measure indicating a transmit power at which the data burst was transmitted over the plurality of channels;
determining signal quality measurements relating to the receipt of the return link data bursts over the plurality of channels;
determining an updated transmit power based on the signal quality measurements and the power measure, wherein the updated transmit power is calculated to achieve a target signal quality for receipt of one or more subsequent return link data bursts over the plurality of channels;
determining a link quality margin for each of the return link data bursts based on the signal quality measurements and the power measure;
determining one or more composite measures based on the link quality margins for a number of the return link data bursts, wherein the determination of the one or more composite measures comprises first and second order statistics, including mean and standard deviation computations, wherein the updated transmit power is determined based on the one or more composite measures; and
generating a power control message configured to communicate the updated transmit power to at least one further communications device.

20. The method of claim 19, wherein the signal quality measurements include one or more of signal to noise ratio (SNR) measurements and cyclical redundancy check (CRC) errors.

21. The method of claim 19, wherein the signal quality measurements further include a cyclical redundancy check (CRC) error indication relating to the receipt of each of the return link data bursts, the method further comprising:
determining a CRC link quality margin based on one or more of the CRC indicators; and
wherein the determination of the updated transmit power is further based on the CRC link quality margin.

22. The method of claim 19, further comprising:
generating a composite return link data burst for each of the return link data bursts received over the plurality of channels; and
wherein the signal quality metric information reflects one or more of signal quality measurements relating to the receipt of each return link data burst over each of the plurality of channels and signal quality measurements relating to the composite return data transmission signal for each of the return link data bursts received over the plurality of channels.

23. The method of claim 19, wherein the target signal quality comprises a target signal quality for receipt of one or more subsequent composite return link data bursts, each reflecting a composite return link data burst based on a respective one of the subsequent return link data bursts received over each of the plurality of channels of the wireless communications network.

24. The method of claim 19, further comprising:
determining that the updated transmit power exceeds a predetermined maximum transmit power for one or more of the further communications device(s);
determining modulation and coding schemes based on the signal quality metric information and the maximum transmit power, wherein the modulation and coding schemes are determined to achieve the target signal quality for receipt of the one or more subsequent return link data bursts, transmitted at the maximum transmit power, over the plurality of channels of the wireless communications network; and
generating a mod/cod message configured to communicate the modulation and coding schemes, and the maximum transmit power, to the one or more further communications device(s).

25. The method of claim 19, wherein:
at least one of the channels of the wireless communications network supports asymmetric data transmissions, including a plurality of data bursts of differing symbol rates; and
the power control message comprises a normalized message facilitating derivation of respective transmit power settings associated with the differing symbol rates.

26. The method of claim 25, wherein the determination of the modulation and coding schemes comprises, increasing a burst size for the subsequent return link data bursts and determining the modulation and coding schemes based on the increased burst size, while maintaining a current symbol rate for the subsequent return link data bursts.

27. An apparatus comprising:
a transmitter configured to transmit a plurality of forward link data bursts over a channel of a wireless communications network, each being transmitted at a respective transmit power;
a memory configured to store the respective transmit powers for the forward link data bursts;
a receiver configured to receive a plurality of return link data bursts, wherein each of one or more of the return link data bursts includes one or more signal quality metrics reflecting signal quality measurements relating to a respective one of the forward link data bursts; and
a processor configured to correlate the signal quality metrics for each of one or more of the forward link data bursts with the stored transmit power for the respective forward link data burst to which the signal quality metrics are related; and
wherein the processor is further configured to determine an updated transmit power based on the signal quality metrics and the correlated respective transmit powers, wherein the updated transmit power is calculated to achieve a target signal quality for transmission of one or more subsequent forward link data bursts.

28. The apparatus of claim 27, wherein:
the processor is further configured to determine a link quality margin based on the signal quality metrics and the correlated respective transmit powers, wherein the determination of the link quality margin comprises first and second order statistics, including mean and standard deviation computations; and
the updated transmit power is determined based on the link quality margin.

29. The apparatus of claim 27, wherein the signal quality measurements include one or more of signal to noise ratio (SNR) measurements and cyclical redundancy check (CRC) errors.

30. The apparatus of claim 27, wherein the signal quality metrics for each of the one or more forward link data bursts further include a cyclical redundancy check (CRC) error indicator relating to the transmission of the respective forward link data bursts, wherein:
the processor is further configured to determine a CRC link quality margin based on the CRC indicators relating to one or more of the forward link data bursts all transmitted over the channel at a one of the respective transmit powers; and
the determination of the updated transmit power is further based on the CRC link quality margin.

31. The apparatus of claim 27, wherein:
each of one or more of the return link data bursts includes one or more signal quality metrics relating to a respective number of the forward link data bursts all transmitted over the channel at a one of the respective transmit powers; and
the signal quality metrics of such return link data bursts reflect statistical measurements regarding a series of the signal quality measurements associated with the number of the forward link data bursts all transmitted over the channel at the one respective transmit power.

32. The apparatus of claim 31, wherein the statistical measurements comprise one or more of a mean and standard deviation for the series of the signal quality measurements.

33. The apparatus of claim 27, wherein a number of the return link data bursts each includes signal quality metrics reflecting signal quality measurements relating to a respective number of the forward link data bursts all transmitted over the channel at a one of the respective transmit powers, and wherein the processor is further configured to:
determine a link quality margin for each of the number of return link data bursts based on the respective signal quality metrics of the return link data burst and the one respective transmit power; and
determine a mean and standard deviation for the determined link quality margins, wherein the updated transmit power is determined based on the mean and standard deviation.

34. The apparatus of claim 33, wherein the signal quality metrics for each of the number of forward link data bursts transmitted over the channel at a one of the respective transmit powers further include a cyclical redundancy check (CRC) error indicator relating to the transmission of the respective forward link data bursts, wherein:
the processor is further configured to determine a CRC link quality margin based on the CRC error indicators; and
the determination of the updated transmit power is further based on the CRC link quality margin.

35. The apparatus of claim 34, wherein the signal quality metrics for one or more of the number of return link data bursts reflects a mean of a series of the signal quality measurements associated with the number of the forward link data bursts all transmitted over the channel at the one respective transmit power.

36. The apparatus of claim 27, wherein the processor is further configured to:
compare the updated transmit power to a predetermined maximum transmit power; and
when the processor determines that the updated transmit power exceeds the predetermined maximum transmit power, the processor is further configured to determine modulation and coding schemes based on the signal quality metrics, wherein the modulation and coding schemes are determined to achieve a target signal quality for transmission of one or more subsequent forward link data bursts at the maximum transmit power over the channel.

37. The apparatus of claim 36, wherein the determination of the modulation and coding schemes comprises, increasing a burst size for the subsequent forward link data bursts and determining the modulation and coding schemes based on the increased burst size, while maintaining a current symbol rate for the subsequent forward link data bursts.

38. An apparatus comprising:
a transmitter configured to transmit a plurality of forward link data bursts at a predetermined transmit power to multiple communications terminals over a first shared channel of a wireless communications network;
a receiver configured to receive a plurality of return link data bursts, wherein the return link data bursts are received from the multiple communications terminals, and each of one or more of the return link data bursts received from each of the communications terminals includes one or more signal quality metrics reflecting signal quality measurements relating to a respective one of the forward link data bursts; and
a processor configured to determine modulation and coding schemes based on the signal quality metrics and the predetermined transmit power, wherein the modulation and coding schemes are determined to achieve a target signal quality for transmission of one or more subsequent forward link data bursts at the predetermined transmit power to the multiple communications terminals over the first shared channel; and
wherein the determination of the modulation and coding schemes comprises first and second order statistics, including mean and standard deviation computations.

39. The apparatus of claim 38, wherein the signal quality measurements include one or more of signal to noise ratio (SNR) measurements and cyclical redundancy check (CRC) errors.

40. The apparatus of claim 38, wherein the signal quality metrics for each of the one or more forward link data bursts further include a cyclical redundancy check (CRC) error indicator relating to the transmission of the respective forward link data bursts transmitted over the first shared channel at the predetermined transmit power, wherein:
the processor is further configured to determine a CRC link quality margin based on the CRC indicators relating to one or more of the forward link data bursts; and
the determination of the modulation and coding schemes is further based on the CRC link quality margin.

41. The apparatus of claim 38, wherein:
  each of one or more of the return link data bursts includes one or more signal quality metrics relating to a respective number of the forward link data bursts; and
  the signal quality metrics of such return link data bursts reflect statistical measurements regarding a series of the signal quality measurements associated with the number of the forward link data bursts.

42. The apparatus of claim 41, wherein the statistical measurements comprise one or more of a mean and standard deviation for the series of the signal quality measurements.

43. The apparatus of claim 38, wherein:
  the return link data bursts received from at least one of the communications terminals are received over the first shared channel and the return link data bursts received from one or more other of the communications terminals are received over one or more respective dedicated channels of the wireless communications network; and
  the return link data bursts received over the first shared channel are at a different periodicity compared to the return link data bursts received over the one or more respective dedicated channels.

44. The apparatus of claim 38, wherein:
  the signal quality metrics relating to the transmission of the forward link data bursts at the predetermined transmit power to a one of the communications terminals over the first shared channel reflects an inferior signal quality relative to the signal quality metrics relating to the transmission of the forward link data bursts at the predetermined transmit power to the other of the communications terminals over the first shared channel; and
  the modulation and coding schemes are determined based on the signal quality metrics reflecting the inferior signal quality and the predetermined transmit power.

45. An apparatus comprising:
  a receiver configured to receive a plurality of return link data bursts over each of a plurality of channels of a wireless communications network, wherein each return link data burst includes a power measure indicating a transmit power at which the data burst was transmitted over the plurality of channels;
  a processor configured to determine signal quality measurements relating to the receipt of the return link data bursts over the plurality of channels; and
  wherein the processor is further configured to determine an updated transmit power based on the signal quality measurements and the power measure, wherein the updated transmit power is calculated to achieve a target signal quality for receipt of one or more subsequent return link data bursts over the plurality of channels;
  wherein the processor is further configured to determine a link quality margin for each of the return link data bursts based on the signal quality measurements and the power measure;
  wherein the processor is further configured to determine one or more composite measures based on the link quality margins for a number of the return link data bursts, wherein the determination of the one or more composite measures comprises first and second order statistics, including mean and standard deviation computations, wherein the updated transmit power is determined based on the one or more composite measures; and
  wherein the processor is further configured to generate a power control message configured to communicate the updated transmit power to at least one further communications device.

46. The apparatus of claim 45, wherein the signal quality measurements include one or more of signal to noise ratio (SNR) measurements and cyclical redundancy check (CRC) errors.

47. The apparatus of claim 45, wherein the signal quality measurements further include a cyclical redundancy check (CRC) error indication relating to the receipt of each of the return link data bursts, wherein:
  the processor is further configured to determine a CRC link quality margin based on one or more of the CRC indicators; and
  the determination of the updated transmit power is further based on the CRC link quality margin.

48. The apparatus of claim 45, wherein:
  the processor is further configured to generate a composite return link data burst for each of the return link data bursts received over the plurality of channels; and
  the signal quality metric information reflects one or more of signal quality measurements relating to the receipt of each return link data burst over each of the plurality of channels and signal quality measurements relating to the composite return data transmission signal for each of the return link data bursts received over the plurality of channels.

49. The apparatus of claim 45, wherein the target signal quality comprises a target signal quality for receipt of one or more subsequent composite return link data bursts, each reflecting a composite return link data burst based on a respective one of the subsequent return link data bursts received over each of the plurality of channels of the wireless communications network.

50. The apparatus of claim 45, wherein the processor is further configured to:
  compare the updated transmit power to a predetermined maximum transmit power; and
  when the processor determines that the updated transmit power exceeds the predetermined maximum transmit power, the processor is further configured to determine modulation and coding schemes based on the signal quality metric information and the maximum transmit power, wherein the modulation and coding schemes are determined to achieve the target signal quality for receipt of the one or more subsequent return link data bursts, transmitted at the maximum transmit power, over the plurality of channels of the wireless communications network; and
  wherein the processor is further configured to generate a mod/cod message configured to communicate the modulation and coding schemes, and the maximum transmit power, to the one or more further communications device(s).

51. The apparatus of claim 45, wherein:
  at least one of the channels of the wireless communications network supports asymmetric data transmissions, including a plurality of data bursts of differing symbol rates; and
  the power control message comprises a normalized message facilitating derivation of respective transmit power settings associated with the differing symbol rates.

52. The apparatus of claim 51, wherein the determination of the modulation and coding schemes comprises, increasing a burst size for the subsequent return link data bursts and determining the modulation and coding schemes based on the increased burst size, while maintaining a current symbol rate for the subsequent return link data bursts.

* * * * *